(12) United States Patent
Natsume

(10) Patent No.: US 6,646,589 B2
(45) Date of Patent: Nov. 11, 2003

(54) RADAR DESIGNED TO MINIMIZE ERROR IN DETECTING TARGET

(75) Inventor: Kazuma Natsume, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/241,606

(22) Filed: Sep. 12, 2002

(65) Prior Publication Data

US 2003/0052813 A1 Mar. 20, 2003

(30) Foreign Application Priority Data

Sep. 17, 2001 (JP) ........................................ 2001-281597
Aug. 1, 2002 (JP) ........................................ 2002-225065

(51) Int. Cl.[7] ............................................. G01S 13/93
(52) U.S. Cl. ............................. 342/70; 342/71; 342/72; 342/107; 342/109; 342/113; 342/114; 342/115; 342/196
(58) Field of Search ................................ 342/70–72, 89, 342/107, 109, 111, 113–115, 128, 129, 135, 192, 196

(56) References Cited

U.S. PATENT DOCUMENTS

| | | | | |
|---|---|---|---|---|
| 5,369,409 A | * | 11/1994 | Urabe et al. ................. 342/133 |
| 5,757,307 A | * | 5/1998 | Nakatani et al. ............... 342/70 |
| 5,977,904 A | * | 11/1999 | Mizuno et al. ................ 342/70 |
| 6,121,917 A | * | 9/2000 | Yamada ....................... 342/128 |
| 6,292,129 B1 | | 9/2001 | Matsugatani et al. ......... 342/70 |
| 6,337,656 B1 | * | 1/2002 | Natsume et al. ............. 342/149 |
| 6,414,628 B1 | * | 7/2002 | Ashihara ..................... 342/173 |
| 6,476,760 B1 | * | 11/2002 | Winter et al. ................ 342/173 |
| 2001/0015698 A1 | * | 8/2001 | Tokoro ......................... 342/70 |

FOREIGN PATENT DOCUMENTS

| | | |
|---|---|---|
| JP | 5-150037 | 6/1993 |
| JP | 8-105963 | 4/1996 |
| JP | 2000-284047 | 10/2000 |

* cited by examiner

Primary Examiner—Thomas H. Tarcza
Assistant Examiner—Isam Alsomiri
(74) Attorney, Agent, or Firm—Posz & Bethards, PLC

(57) ABSTRACT

An FMCW radar is provided which may be employed in automotive anti-collision or radar cruise control systems. In a distance measuring mode, only one of channels is used to sample a beat signal continuously, thereby allowing a sampling frequency to be increased up to Nc times that in an azimuth measuring mode and a sweep time in which a transmit signal sweeps in frequency upward and downward cyclically to be minimized. This causes half the sampling frequency to be higher than a frequency component arising sufficiently from a distant target present outside a preset radar range, thereby eliminating an error in detecting the distant target as being located inside the preset radar range.

9 Claims, 15 Drawing Sheets

INCREASED CYCLE OF FREQUENCY MODULATION (SWEEP TIME T)

DECREASED CYCLE OF FREQUENCY MODULATION $$fb = (fs/2 - fb') + fs/2$$
$$= fs - fb'$$

RADAR DESIGNED TO MINIMIZE ERROR IN DETECTING TARGET

BACKGROUND OF THE INVENTION

1 Technical Field of the Invention

The present invention relates generally to a radar such as an FMCW (Frequency Modulated Continuous Wave) radar which is designed to transmit a frequency-modulated radar wave and receive a return thereof from an object through a plurality of antennas to determine the distance to, relative speed, and azimuth or angular direction of the object.

2 Background Art

Recently, radars are tried to be used in an anti-collision device of automotive vehicles. As such as radars, FMCW radars designed to measure both the distance to and relative speed of a target are proposed for ease of miniaturization and reduction in manufacturing cost thereof.

Typical FMCW radars transmit a radar signal Ss, as indicated by a solid line in FIG. 9(a), which is frequency-modulated with a triangular wave to have a frequency increasing and decreasing, i.e., sweeping upward and downward cyclically in a linear fashion and receive a radar return of the transmitted radar signal Ss from a target. The received signal Sr, as indicated by a broken line, usually undergoes a delay of time Tr the radar signal Ss takes to travel from the radar to the target and back, that is, a time lag depending upon the distance to the target and is doppler-shifted in frequency by Fd as a function of the relative speed of the target.

The received signal Sr and the transmitted signal Ss are mixed together by a mixer to produce a beat signal B, as shown in FIG. 9(b), whose frequency is equal to a difference in frequency between the received signal Sr and the transmitted signal Ss. If the frequency of the beat signal B when the frequency of the transmitted signal Ss is increasing or sweeping upward, which will be referred to below as a beat frequency in a modulated frequency-rising range, is defined as fb1, the frequency of the beat signal B when the frequency of the transmitted signal Ss is sweeping downward, which will be referred to below as a beat frequency in a modulated frequency-falling range, is defined as fb2, then the frequency fr due to the time delay Tr and the doppler-shifted frequency fd may be expressed as:

$$fr = \frac{fb1 + fb2}{2} \quad (1)$$

$$fd = \frac{fb1 - fb2}{2} \quad (2)$$

Using the frequencies fr and fd, the distance R to and relative speed V of the target may be expressed as:

$$R = \frac{c \cdot fr}{4 \cdot fm \cdot \Delta F} \quad (3)$$

$$V = \frac{c \cdot fd}{2 \cdot Fo} \quad (4)$$

where c is the propagation speed of a radio wave, fm is a modulation frequency of the transmitted signal Ss, $\Delta F$ is a variation in frequency (i.e., amplitude) of the transmitted signal Ss, and Fo is a central frequency of the transmitted signal Ss.

The determination of the beat frequencies fb1 and fb2 is made usually using a signal processor. Specifically, the beat signal B is sampled in sequence and subjected to fast Fourier transform (FFT) in each of the modulated frequency-rising and -falling ranges to find a frequency spectrum of the beat signal B. Frequency components showing peaks in signal strength within the modulated frequency-rising and -falling ranges are determined as the beat frequencies fb1 and fb2, respectively.

The sampling frequency fs of the beat signal B, as is well known in the art, needs to be twice an upper frequency limit of the beat signal B. Specifically, the frequency variation $\Delta F$ and a modulation cycle 1/fm of a radar wave are so set that frequency components of the beat signal B due to returns of the radar wave from targets present within a preset target detecting range may fall within a band preset below the upper frequency limit of the beat signal B.

Usually, returns of the radar wave from stationary objects such as footbridges or buildings near a road much bigger in size than ordinary automotive vehicles are strong in level even if they are out of the target detecting range (such objects will be referred to as long range targets below). Therefore, when the radar receives a radar return from the long range target, it will cause the beat signal B to contain, as shown in FIG. 10(a), a frequency component exceeding the upper frequency limit. FIG. 10(a) illustrates a frequency spectrum of the beat signal B. In this case, when the beat signal B is sampled and subjected to the FFT, it will cause the frequency component due to the long range target exceeding the upper frequency limit of the beat signal B to be shifted, as indicated by a broken line, to a location that is symmetric with respect to half the sampling frequency fs, so that it appears as a frequency peak within the preset band. This causes the radar to identify the long range target as lying within the target detecting range in error.

Even in the absence of the long range targets, the FFT of samples of the beat signal B may cause any noise components, as shown in FIG. 10(b), to move from outside the upper frequency limit of the beat signal B to inside the preset band, thereby resulting in rise of a noise floor within the preset band, which leads to a drop in SN ratio, thus resulting in lowering of the radar performance. In order to avoid this problem, an anti-aliasing filter may be coupled to an output of the mixer to remove, as shown in FIG. 10(c), noise components lying outside the preset band, especially frequency components over half the sampling frequency fs from the beat signal B produced by the mixer.

Electronically-scanned radar systems are also known as being designed for spreading the target detecting range or improving the accuracy of determining the angular direction of a target. Such a type of radar system works to receive a return of a radar wave from a target through a plurality of antennas and determine the angular direction of the target based on differences in phase and level of the signals received by the antennas. For instance, U.S. Pat. No. 6,292,129 to Matsugatani et al. (corresponding to Japanese Patent First Publication No. 2000-284047), assigned to the same assignee as that of this application, teaches the electronically-scanned radar system which uses a single mixer for decreasing manufacturing costs. The mixer is designed to process signals received by a plurality of antennas in time division to produce a beat signal. In the following discussion, combinations of transmit antennas and receive antennas will be referred to as channels, respectively.

The use of an anti-aliasing filter in the above system in which the mixer processes inputs from the antennas in time division gives rise to a difficulty in deriving information about targets accurately. Specifically, if a cycle in which the channels are switched from one to another is defined as 1/fx, a time division-multiplexed signal inputted to the mixer contains a harmonic that is an integral multiple of a frequency fx. An output of the mixer, that is, the beat signal B, thus, contains a frequency component arising from that harmonic, resulting in an increase in frequency band of the beat signal B. This causes the anti-aliasing filter to eliminate information as well which is required to demultiplex the time division-multiplexed signal into discrete components for the respective channels. This results in overlapping of the discrete components, thus leading to a difficulty in sampling the levels of the signals received by the antennas accurately.

Radar systems using a plurality of transmit antennas work to multiplex a radar wave in time division. Therefore, even if mixers are provided one for each receive antenna, they receive returns of time division-multiplexed components of the radar wave, respectively, thus giving rise to the same problem as described above.

The determination of an angular direction of a target as functions of differences in phase and intensity of return signals received by a plurality of channels requires time consistency or synchronization between the return signals. To this end, all data items required for the FFT in each channel need to be acquired within a sweep time T (=1/2fm) required for each of upward and downward sweeps of the frequency of a transmit signal (i.e., within each of the modulated frequency-rising and -falling ranges).

If a total number of data items to be sampled within the sweep time T is defined as n (=number Nc of channels× number Dpc of data items to be sampled in each channel), and a time interval at which the channels are switched from one to another is defined as 1/fx, the sweep time T may be expressed as:

$$T = \frac{1}{2 \cdot fm} = \frac{n}{fx} \qquad (5)$$

where the sampling frequency fs in each channel=fx/Nc. Note that the channel switching interval 1/fx is restricted to less than a switching speed of a high-frequency switch working to switch between connections of antennas with a mixer or an operation speed (i.e., a sampling speed) of an A/D converter working to sample the beat signal, whichever is the slower.

If the number Dpc of data items to be sampled in each channel is fixed, the sweep time T depends only on the number Nc of channels. Increasing the number Nc of channels in order to improve the ability of determining the angular direction of a target, thus, results in an increase in sweep time T.

Such an increase in sweep time T in typical FMWC radars, however, results in an undesirable decrease in a radar range capable of determining the relative speed V of a target. Specifically, the beat frequencies fb1 and fb2 that are produced by the FFT are measured at an integral multiple of a unit frequency 1/T that is the reciprocal of the sweep time T. The resolution Δf of the beat frequencies fb1 and fb2, i.e., resolutions Δfr and Δfd of the frequencies fr and fd are, thus, given by equation below.

$$\Delta f ( = \Delta fr = \Delta fd) = \frac{1}{T} = \frac{fx}{n} \qquad (6)$$

The resolution ΔR in range of the FMCW radar is expressed by equation (7) below which is rewritten by substituting Δfr for fr in the right side of equation (3).

$$\Delta R = \frac{c \cdot \Delta fr}{4 \cdot fm \cdot \Delta F} = \frac{c}{2 \cdot \Delta F} \qquad (7)$$

The resolution ΔV in determining the relative speed of a target is expressed in equation (8) below which is obtained by substituting Δfd for fd in the right side of equation (4) and rewriting it using equation (6).

$$\Delta V = \frac{c \cdot \Delta fd}{2 \cdot Fo} = \frac{c}{2 \cdot Fo \cdot T} \qquad (8)$$

Eqs. (7) and (8) show that increasing the frequency variation ΔF results in an increase in the range resolution ΔR, and increasing the sweep time T results in an increase in speed resolution ΔV, but in an undesirable decrease in a radar range capable of determining the relative speed V of a target.

FIG. 11(a) shows a variation in sweep time T for different values of the sampling frequency fs in one channel in a modulation mode A (185 kHz) and a modulation mode B (370 kHz) if the frequency variation ΔF is constant (200 MHz). FIG. 11(b) shows a change in radar range within which the distance R to and the relative speed V of a target can be determined. As is clear from the drawings, increasing of the sweep time Tin the modulation mode A results in a decrease in radar range within which the relative speed V can be determined. Note that a maximum measurable distance to an object is determined when fr=fs/2, and a maximum measurable relative speed of the object is determined when fd=fs/4. The number Dpc of data items to be sampled in each channel is 512.

Particularly, radars having multiple channels made up of a plurality of transmit antennas must be on standby for at least a time a radar wave takes to travel from the radar to a target and back in order to eliminate a problem that after the channels has been switched from one to another, a beat signal arising from a return of a radar wave outputted by a preceding one of the transmit antennas from being sampled in error as arising from a return of a radar wave outputted from the transmit antenna of the channel now selected. Specifically, it is necessary to increase the sweep time Tin order to avoid such a problem.

Typical FMCW radar usually receive a return of a radar wave from a road surface through a beam formed by an antenna, which will be added to a beat signal as an unwanted signal component, thereby disturbing detection of a beat frequency within a frequency band of such a signal component. For instance, a return of a radar wave from a road surface, as shown in FIG. 12, received by a side lobe is usually what has entered to a radar from a close distance less than the range resolution of the radar, so that a frequency component arising from a time lag between transmission of the radar wave and reception of the return thereof. The radar wave travels forward of the vehicle and falls on the road surface at an angle θ. The incident angle θ is a function of distance between a portion of the road surface on which the radar wave falls and the vehicle. A component of a road surface-to-vehicle speed in a direction of the incident angle θ, as indicated by black arrows in the drawing, that is, an apparent relative speed of a target determined based on the return of the radar wave from the road surface, therefore, varies greatly. This variation results in a variation in Doppler shift of the return of the radar wave received by the radar, thus causing unwanted signal components over a wide range to be added to the beat signal.

SUMMARY OF THE INVENTION

It is therefore a principal object of the present invention to avoid the disadvantages of the prior art.

It is another object of the present invention to provide a radar apparatus with improved reliability which is designed to eliminate an error in detecting a distant target present outside a preset radar detecting range and also minimize an adverse effect of a return of a radar wave from a road surface without sacrificing the ability of the radar to determine the distance to and relative speed of a target.

According to one aspect of the invention, there is provided a radar apparatus which may be installed in an automotive vehicle to detect an object present ahead to determine the distance to, relative speed, and azimuth or angular direction of the object. The radar apparatus comprises: (a) a transmit signal generator generating a transmit signal which is so modulated in frequency as to vary with time cyclically; (b) a transceiver having a plurality of channels each of which is made up of a transmit antenna and a receive antenna, the transceiver outputting the transmit signal in the form of a radar wave and receiving a return of the radar wave from a target through any of the channels; (c) a switching circuit switching one of the channels to another which is to be used in the transceiver; (c) a beat signal generator generating a beat signal; and (e) a signal processor sampling the beat signal produced by the beat signal generator and subjecting samples of the beat signal to a given signal processing operation to produce predetermined information about the target.

The switching circuit performs a first switching control mode and a second switching control mode within each cycle of frequency-modulation of the transmit signal. In the first switching control mode, all the channels are selected in sequence in a cycle. In the second switching control mode, a predetermined number of the channels are selected in a cycle. The beat signal generator mixes a return signal received by one of the channels or return signals received by all of the channels selected by the switching circuit with a local signal that has the same frequency as that of the transmit signal to produce the beat signal. When all of the channels are selected in sequence, the beat signal is produced by multiplexing the return signals in time division.

In the second switching control mode, the part of the channels are, as described above, used, thereby increasing the degree-of-freedom to set the cycle of frequency-modulation of the transmit signal and an inclination of the modulated frequency of the transmit signal. For instance, it is possible to shorten the cycle of frequency-modulation for increasing the inclination of the modulated frequency and a cycle in which the beat signal is sampled by the signal processor in each channel. This results in improved accuracy of detecting a desired target.

In the preferred mode of the invention, the transmit signal generator changes a cycle of frequency-modulation of the transmit signal to a time length required to acquire the samples of the beat signal required in an operation of the signal processor as a function of a number of the channels to be switched by the switching circuit. If the inclination of the modulated frequency of the transmit signal is set smaller in the first switching control mode, it is possible to determine the relative speed of the target at high resolution. If the inclination of the modulated frequency of the transmit signal is set greater in the second switching control mode, it is possible to spread a range in which the relative speed of the target can be determined.

The shortened cycle of frequency-modulation results in a decreased spread of an unwanted signal component arising from reflection of the radar wave from a road surface, thus facilitating measurement of a frequency component of the beat signal due to reflection of the radar wave from a desired target, which results in increased accuracy of finding beat frequencies.

For instance, if Fast Fourier Transforms of samples of the beat signal are calculated, beat frequencies fb1 and fb2 i.e., frequencies fr and fd may be expressed in a unit that is the frequency resolution Δf, as expressed by Eq. (6), which corresponds to a unit (i.e., LSB) in binary notation used to express the frequencies fr and fd. In the following discussion, a value as expressed using such a unit will be referred to as a frequency point. As can be seen from the above Eq. (8), the magnitude of frequency, as expressed by the frequency point, increases with a decrease in cycle of frequency-modulation (i.e., the sweep time T).

However, the range resolution ΔR, as expressed by Eq. (7), determined as a function of the frequency resolution ΔF is independent of the sweep time T. Thus, if the distance R to a target is constant, a value of R/ΔR will be constant, so that the frequency point indicative of the distance R (i.e., the frequency fr) will also be constant regardless of the sweep time T. The speed resolution ΔV, as expressed by Eq. (8), determined as a function of the frequency resolution ΔF changes as a function of the sweep time T. Thus, even if the relative speed V of a target is constant, the frequency point indicative of the relative speed V becomes great as the sweep time T increases.

The unwanted signal component arising from the reflection of the radar wave from the road surface substantially arises from the Doppler shift only. As the sweep time T is decreased, a band of the unwanted signal component, that is, the frequency fd, as expressed by the frequency point, is decreased. The beat frequencies fb1 and fb2 arising from reflection of a radar wave from a target within the preset radar detecting range are located at an interval away from each other that is equivalent to the frequency fd that is a function of the relative speed V across the frequency fr that is a function of the distance R. As the sweep time T is decreased, the beat frequencies fb1 and fb2, as expressed by the frequency point, move close to the frequency fr. In other words, the frequency fd decreases. Therefore, an increase in the sweep time T, as shown in FIG. 13(a), may cause the frequency point indicative of the unwanted signal component to overlap the frequency point indicative of the beat frequency fb1 arising from the target. Conversely, a decrease in the sweep time T, as shown in FIG. 13(b), results in a decrease in width of the frequency point indicative of the unwanted signal component and a shift in frequency point indicative of the beat frequency fb1 away from the unwanted signal component, thus enabling the frequency point indicative of the unwanted signal component to be shifted away from the frequency points indicative of the beat frequencies fb1 and fb2.

The signal processor may be designed to perform a first operation mode in which an angular direction of the target is determined using a component of the beat signal acquired in the first switching control mode and a second operation mode in which a distance to and a relative speed of the target are determined using a component of the beat signal acquired in the second switching control mode. Specifically, the number of the channels selected in the first switching control mode is smaller than that in the second switching control mode. Therefore, if a switching interval of the channels is constant, it will permit the sampling interval in each of the channels to be shortened, that is, a sampling frequency in each of the channels to be increased. The determination of the distance to and relative speed of a target may be achieved only using data acquired in one of the channels. Decreasing the channels to be used, therefore, does not produce an adverse effect on the determination of the distance to and relative speed of the target.

Accordingly, decreasing the channels to be selected in the second switching control mode so that half the sampling frequency in each of the channels may be higher than a maximum frequency of a signal component produced by a return of the radar wave from a long range target present outside a preset radar detecting range prevents that signal component from being shifted by the operation of the signal processor to inside a preset band of the beat signal. This eliminates an error in identifying the long range target as a target present within the preset radar detecting range.

Further, in the second switching control mode, noise components caused by shifts in component of the beat signal produced by the operation of the signal processor such as Fourier transform to within the preset band of the beat signal are smaller than those in the first switching control mode, thus resulting in a reduction in rise in noise floor, which results in improved ability of the radar apparatus to measure the beat frequencies.

The signal processor may work in the first operation mode to estimate a frequency component, which is to be concluded in the beat signal in the second operation mode, using on a frequency component of the beat signal derived by a given operation performed in the first operation mode. The signal processor may perform a digital beam forming operation on the estimated frequency component to determine the angular direction of the target.

When all the channels are used in the first switching control mode, it may cause a frequency component of the beat signal arising from a long range target present outside the radar detecting range to be shifted as a noise to inside the preset band of the beat signal. The frequency component arising from a target present within the radar detecting range may, however, be known in the second switching control mode, thus allowing the angular direction of the target to be determined accurately in the first switching control mode using the known frequency component without removing the noise from the preset band of the beat signal if the noise is inconsistent with the known frequency component.

The signal processor may form, in each of the first and second switching control modes, frequency pairs each of which is made up of a frequency component of the beat signal acquired within a modulated frequency-rising range in which the frequency of the transmit signal rises and a frequency component of the beat signal acquired in a modulated frequency-falling range in which the frequency of the transmit signal falls and determines a distance to and a relative speed of an object using each of the frequency pairs. The processor identifies one of the frequency pairs formed in the first switching control mode which is identical in the distance and the relative speed with any of the frequency pairs formed in the second switching control mode as the target to be acquired by the radar apparatus. Specifically, the radar apparatus detects the same object using two measurements in the first and second switching control modes and identifies it as a target only when the two measurements are identical with each other, thus resulting in improved accuracy of acquiring a target.

Typical FMCW radars are designed to determine the distance R to and relative speed V of a target using Eqs. (3) and (4) on condition that when the frequency of the transmit signal Ss, as shown in FIG. 9($a$), sweeps upward, the frequency of the transmit signal Ss is higher than the received signal Sr in the modulated frequency-rising range, while when it sweeps downward, the frequency of the received signal Sr is conversely higher than the transmit signal Ss. However, if there is an object within a short range which shows a higher relative speed, it may cause the received signal Sr to be higher in frequency than the transmit signal Ss in the modulated frequency-rising range or the transmit signal Ss to be higher in frequency than the received signal Sr in the modulated frequency-falling range. The possibility of such an event will increase as the inclination of the modulated frequency of the transit signal Ss increases.

Therefore, if a relation in frequency level between the transmit signal Ss and the received signal Sr has been reversed in either of the modulated frequency-rising and -falling ranges, use of them in Eqs. (3) and (4) will cause an error in determining the distance R to and the relative speed V of a target because the frequencies fr and fd are calculated as absolute values. This gives rise to a problem that even though there are the frequency pairs matched between the first and second switching control modes, they are not identified as a target because the measurements derived in the first and second operation modes are inconsistent with each other.

In order to alleviate such a problem, if there is one of the frequency pairs produced in the first switching control mode which is inconsistent in the distance and the relative speed with any of the frequency pairs produced in the second switching control mode, the signal processor defines the lower of frequencies of the frequency pair inconsistent in the distance and the relative speed as a negative value and calculates the distance and the relative speed again using the negative value.

Specifically, if the inclination of the modulated frequency of the transmit signal in the second switching control mode is, as shown in FIG. 14($b$), greater than in the first switching control mode, as shown in FIG. 14($a$), the possibility that the relation in frequency level between the transmit signal and the received signal has been reversed in either of the modulated frequency-rising and -falling ranges is lower. The above re-calculation results in improved accuracy of identifying a target when the relation in frequency level between the transmit signal and the received signal is reversed only in the first switching control mode.

The FFT of samples of the beat signal, as shown in FIG. 15, will cause the frequency component fib higher than the sampling frequency fs to be shifted across half the sampling frequency fs (i.e., fs/2) and measured as fb'.

Therefore, if there is one of the frequency pairs derived in the first operation mode which is inconsistent with any of the frequency pairs derived in the second operation mode, the signal processor defines either or both of frequency components of the one of the frequency pairs as being arising from the above FFT-caused shift, determines the distance and the relative speed again, and compares them with those calculated in the second operation mode for identifying the target. Note that the frequency component fb is given by fs−fb'.

The transceiver may include a plurality of receive antennas. In this case, the switching circuit preferably has a switch which is designed to select one of signals received by the receive antennas as the received signal. This allows the beat signal generator to have a single mixer to produce the beat signal.

The radar apparatus may further comprise a failure determining circuit which monitors the presence of an inevitable noise component added to the beat signal produced by the beat signal processor. If such a noise component is not detected, the failure determining circuit provides a signal indicative of occurrence of the failure of the radar apparatus.

In a case where the transmit signal generator includes an oscillator which produces the frequency-modulated transmit signal, an FM-AM conversion noise which arises a variation in power (i.e., amplitude) of the oscillator usually produced as a function of an oscillation frequency is added to the beat signal as the inevitable noise component, so that the transmit signal is modulated in amplitude as well as in frequency. Thus, if there is no such a noise component in the beat signal, it may be determined that the transmit signal generator is malfunctioning.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings:

FIG. 7($b$) is a flowchart of a failure monitoring program performed in a radar apparatus of the third embodiment of the invention;

FIG. 9($b$) shows the waveform of a beat signal produced in a typical FMCW radar;

FIG. 10($b$) is an illustration which shows a frequency spectrum of a beat signal containing a noise frequency component appearing within a preset band of the beat signal;

FIG. 10($c$) is an illustration which shows noise component contained in a beat signal which is removed by use of an anti-aliasing filter;

FIG. 11($b$) is an illustration which shows a change in radar range within which the distance to and relative speed of a target can be determined in the modulation modes A and B as illustrated in FIG. 11($a$);

FIG. 13($b$) is an illustration which shows frequency points of beat frequencies when a modulation cycle is shorter;

FIG. 14($b$) shows a relation between a transmit signal and a receive signal and FFTs of samples of a beat signal in a second modulation mode.

DESCRIPTION OF THE PREFERRED EMBODIMENTS

Figure 1:
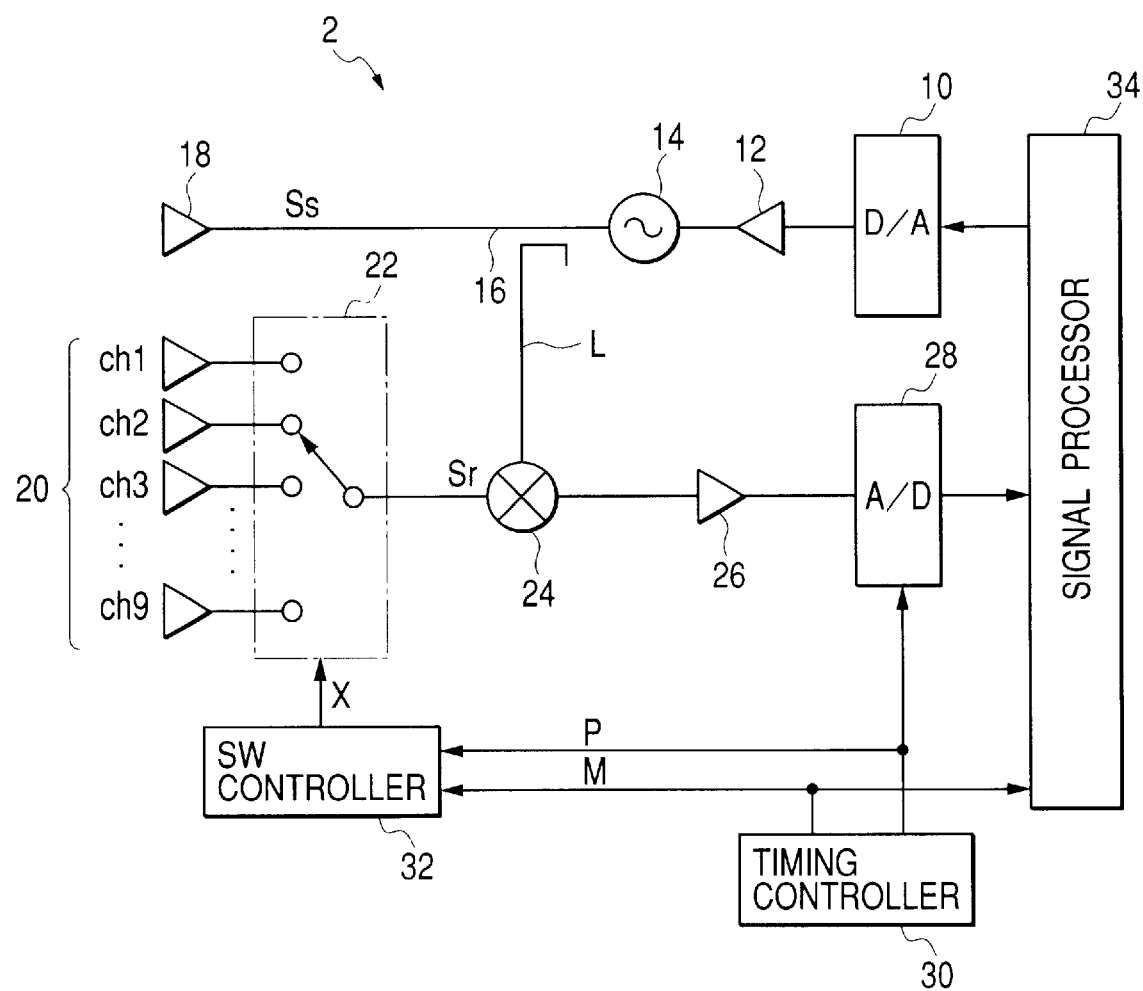
FIG. 1 is a block diagram which shows a radar apparatus according to the present invention.
Figure 2:
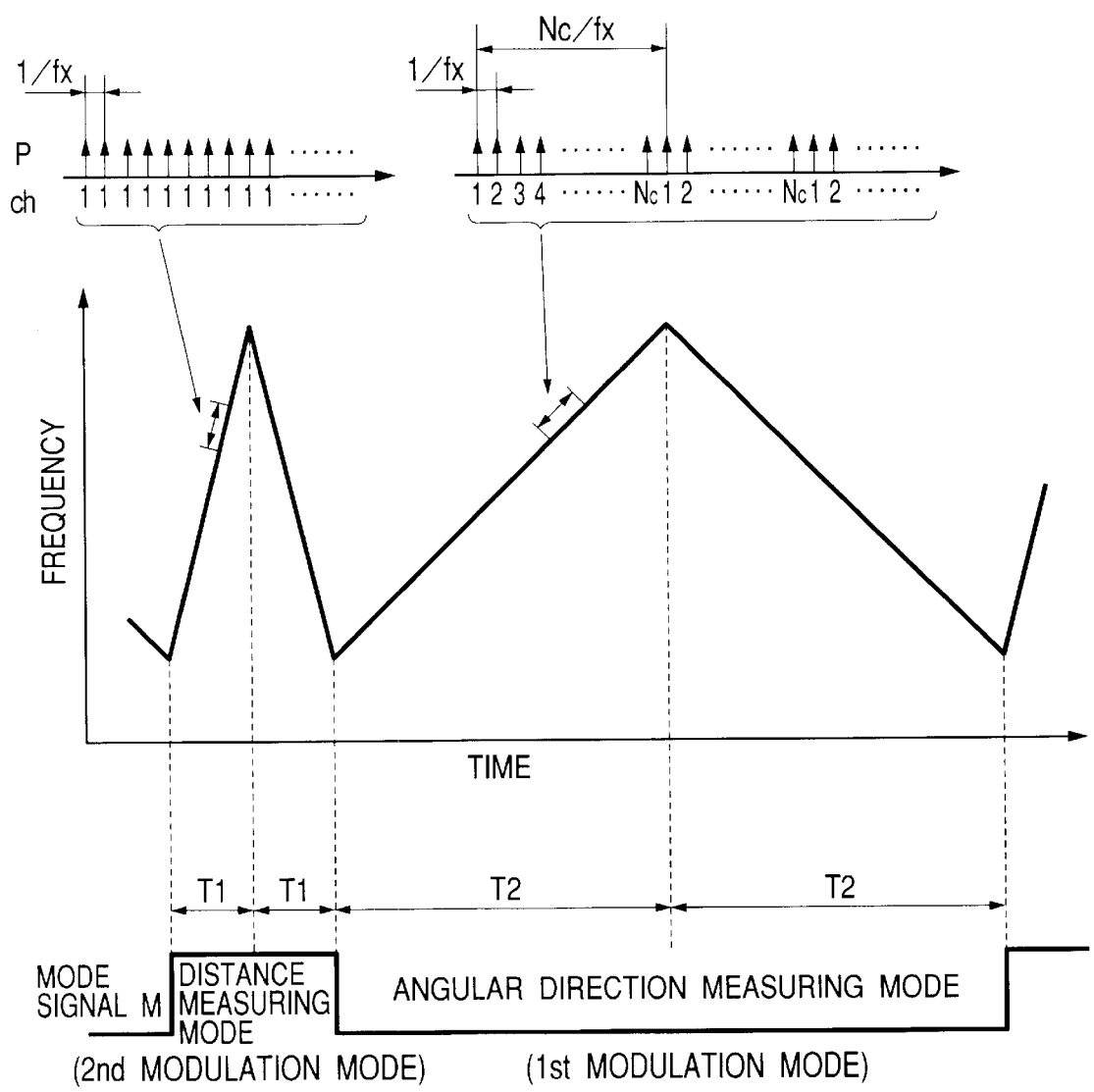
FIG. 2 is an illustration which shows a change in frequency of a transmit signal and a change in level of a mode signal.

Referring now to the drawings, particularly to FIG. 1, there is shown an FMCW radar apparatus 2 according to the present invention which may be employed in automotive anti-collision system or automotive radar cruise control system to detect the presence of obstacles in front of a vehicle.

The radar apparatus 2 generally includes a D/A converter 10, a voltage-controlled oscillator (VOC) 14, a splitter 16, a transmit antenna 18, an antenna array 20, an antenna switch 22, a mixer 24, an amplifier 26, an A/D converter 28, a timing controller 30, a switch controller 32, and a signal processor 34.

The A/D converter 10 is responsive to a modulation command signal from the signal processor 34 to produce a modulating signal in the form of a triangular wave. The modulating signal is inputted through a buffer 12 to the voltage-controlled oscillator 14. The voltage-controlled oscillator 14 outputs a high-frequency signal whose frequency varies with the inputted modulating signal. The splitter 16 splits in power the output of the voltage-controlled oscillator 14 into a transmit signal Ss and a local signal L. The transmit antenna 18 outputs the transmit signal Ss as a radar wave to a frontal obstacle detection range. The antenna array 20 is made up of Nc (eight in this embodiment) receive antennas. The antenna switch 22 is responsive to a selection signal X from the switch controller 32 to select one of connections between the receive antennas and the mixer 24. The mixer 24 mixes the local signal L with a signal Sr received in one of the receive antennas selected by the antenna switch 22 to produce a beat signal B consisting of a frequency component corresponding to the difference in frequency between the signals Sr and L. The amplifier 26 amplifies the beat signal B inputted from the mixer 24 and outputs it to the A/D converter 28. The A/D converter 28 samples the beat signal B in response to a timing signal P outputted from the timing controller 30 to convert it into digital data. The timing controller 30 also produces a mode signal M, as will be described later in detail. The switch controller 32 receives the timing signal P and the mode signal M and outputs the selection signal X to the antenna switch 22. The signal processor 34 is responsive to the mode signal M to provide the modulation command signal to the D/A converter 10 and processes the digital data of the beat signal B produced by the A/D converter 28 to determine the distance to, relative speed, and angular direction of a target which has reflected the radar wave transmitted from the radar apparatus 2.

The voltage-controlled oscillator 14, the transmit antenna 18, the antenna array 20, and the antenna switch 22 form a transceiver. The splitter 16 and the mixer 24 forms a beat signal generator. The timing controller 30 and the switch controller 32 form a channel selection controller.

The voltage-controlled oscillator 14 produces the high-frequency signal in a millimeter wave band which has been modulated with the modulating signal of a triangular wave so that the frequency thereof may increase and decrease, that is, sweep upward and downward in a linear fashion cyclically. The central frequency Fo of the high-frequency signal is 76.5 GHz. The frequency variation ΔF (i.e., amplitude) is 100 MHz.

The beam width of each of the receive antennas of the antenna array 20 (i.e., an angular range within which a drop in gain in a forward direction is less than or equal to 3 dB) covers the whole of beam width of the transmit antenna 18. The receive antennas, as illustrated in FIG. 1, form channels ch1 to chNc, respectively. The timing controller 30 produces the timing signal P in the form of a train of pulses arrayed at an interval or cycle of 1/fx. The timing controller 30 also produces the mode signal M whose level varies cyclically from a first level indicating a first modulation mode to a second level indicating a second modulation mode and back to the first level. The second level is kept for a period of time required to output as many pulses as samples in each channel (the number of samples Dpc in each channel in this embodiment is 512). The first level is kept for a period of time required to output NcxDpc pulses. The cycle 1/fx is set to a switching cycle of the antenna switch 22 or a conversion cycle of the A/D converter 28, whichever is the shorter (200 ns in this embodiment). In the following discussion, the first and second modulation modes will also be referred to as an azimuth measuring mode and a distance measuring mode, respectively.

The switch controller 32 selects a predetermined one of the receive antennas of the antenna array 20 (e.g., the channel ch1) when the mode signal M outputted from the timing controller 30 is in the second level indicative of the distance measuring mode, while it selects all the receive antennas (i.e., all the channels ch1 to chNc) in sequence in response to the timing signal P when the mode signal M is in the first level indicative of the azimuth measuring mode.

The signal processor 34 includes a typical microcomputer which consists of a CPU, a ROM, and a RAM and also includes an arithmetic logic unit such as a DSP which takes the fast Fourier transform (FFT) of data inputted through the A/D converter 28. The time the frequency of the high-frequency signal modulated in the D/A converter takes to sweep from a minimum frequency to a maximum frequency (i.e., the time length of the modulated frequency-rising range) or vice versa (i.e., the time length of the modulated frequency-falling range) will be referred to below as a sweep time. The signal processor 34 produces the modulation command signal so as to change the sweep time between the distance measuring mode and the azimuth measuring mode. The sweep time in the distance measuring mode (i.e., the second modulation mode), which will be referred to as T2 below, is set to Dpcx1/fx. The sweep time in the azimuth measuring mode (i.e., the first modulation mode), which will be referred to as T1 below, is set to NcxDpcx1/fx. In the distance measuring mode, the signal processor 34 processes samples of the beat signal B inputted from the A/D converter 28 and determines the distance to and relative speed of a target. In the azimuth measuring mode, the signal processor 34 processes samples of the beat signals B and determines the azimuth or angular direction of the target.

The FMCW radar apparatus 2, as described above, works to split in power the high-frequency signal produced by the voltage-controlled oscillator 14 into the transmit signal Ss and the local signal L through the splitter 16 and output the transmit signal Ss as a radar wave from the transmit antenna 18.

A return of the radar waves from a target is received by all the receive antennas of the antenna array 20, but the signal Sr received only in one of the channels chi (i=1 to Nc) selected by the antenna switch 22 is supplied to the mixer 24. The mixer 24 combines the received signal Sr and the local signal L inputted from the splitter 16 to produce the beat signal B. The beat signal B is amplified by the amplifier 26 and sampled in the A/D converter 28 in response to the timing signal P from the timing controller 30. The samples are inputted to the signal processor 34.

When the mode signal M indicates the distance measuring mode, one of the channels ch1 to chNc, e.g., the channel ch1 is selected and fixed as being used in the distance measuring mode. Samples of the beat signal B derived in the channel ch1 are inputted in succession to the signal processor 34. The sampling frequency fs is identical with the switching frequency fx of the antenna switch 22. Alternatively, when the mode signal M indicates the azimuth measuring mode, all the channels ch1 to chNc are selected in sequence, so that the signals Sr received by all the receive antennas are time-division multiplexed and inputted to the mixer 24. The beat signal B produced by the mixer 24 is, thus, made up of components which are derived from the received signals Sr provided in all the channels ch1 to chNc and time-division multiplexed. The sampling frequency fs in each of the channels ch1 to chNc is the switching frequency fx divided by the channel number Nc (i.e., fs=fx/Nc).

Figure 3:
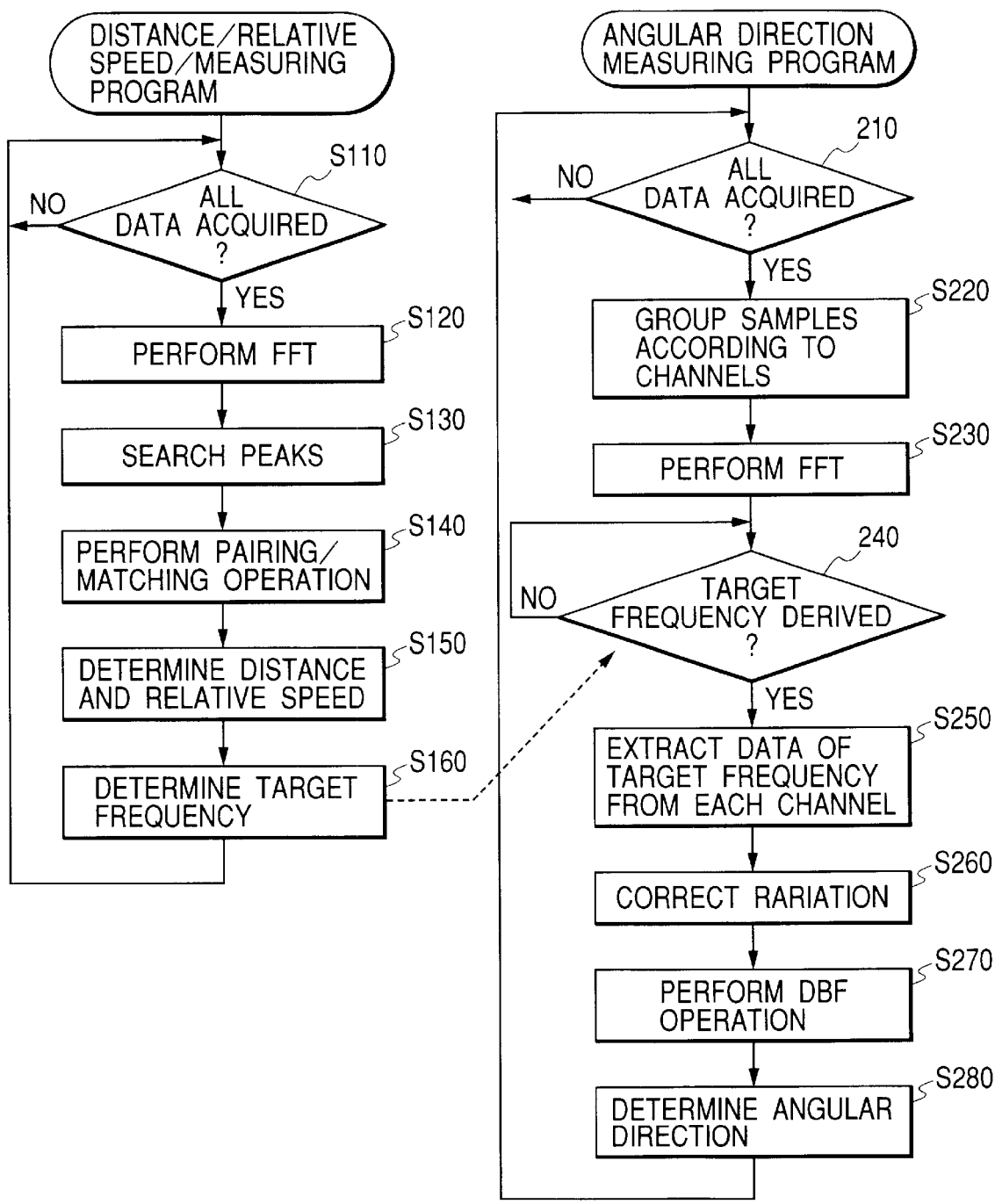
FIG. 3 shows flowcharts of a distance/relative speed measuring program and an angular direction measuring program performed by the radar apparatus of FIG. 1.

FIG. 3 shows flowcharts of programs performed in parallel by the signal processor 34 in two radar modes to determine the angular direction of a target and to determine the distance to and relative speed of the target.

Upon entering the distance/relative speed measuring program, the routine proceeds to step 110 wherein it is determined whether all data items of the beat signal B required to determine the distance to and relative speed of a target have been sampled or not. This determination is made by monitoring whether the mode signal M has changed in level from the distance measuring mode to the azimuth measuring mode or not. If a NO answer is obtained meaning that the mode signal M has not yet changed to the azimuth measuring mode, the routine repeats step 110.

If a YES answer is obtained in step 110, then the routine proceeds to step 120 wherein Dpc data items (512 data items in this embodiment) are sampled from the beat signal B and subjected to Fast Fourier Transform (FFT) in each of the modulated frequency-rising and -falling ranges to produce a frequency spectrum of the beat signal B.

The routine proceeds to step 130 wherein all frequency components (also referred to as peak frequency components below) showing peaks in the frequency spectrum produced in each of the modulated frequency-rising and -falling ranges are searched. This search is taught in, for example, U.S. Pat. No. 6,320,531 B1 assigned to the same assignee as that of this application, disclosure of which is incorporated herein by reference. If the two or more peak frequency components have been searched, the routine proceeds to step 140 wherein the peak frequency components in the modulated frequency-rising range are paired with the peak frequency components in the modulated frequency-falling range by comparing signal strength and phase between the peak frequency components. This pairing operation is taught in, for example, U.S. Pat. No. 6,317,073 B1 assigned to the same assignee as that of this application, disclosure of which is incorporated herein by reference.

The routine proceeds to step 150 wherein the paired peak frequency components are defined as the beat frequencies fb1 and fb2, respectively, and the distance R to and relative speed V of a target is determined using Equations (3) and (4), as discussed above, using each of the peak frequency pairs.

The routine proceeds to step 160 wherein frequencies (will be referred to as target frequencies below) of components of the beat signal B arising from a return of a radar wave from each target are estimated which are expected to appear when data items provided for determining the angular direction of the target are analyzed in frequency. The estimates of the target frequencies (i.e., the beat frequencies) are derived by calculating Eqs. (1) to (4) backward using the distance R and the relative speed V derive din step 150. It is advisable that each of the target frequencies be provided to have a certain band in light of the accuracy of modulation and/or unexpected behavior of the target.

When the angular direction measuring program is entered) the routine proceeds to step 210 wherein it is determined whether all data items of the beat signal B required to determine the angular direction of the target have been sampled or not. This determination is made by monitoring whether the mode signal M has changed in level from the azimuth measuring mode to the distance measuring mode or not. If a NO answer is obtained meaning that the mode signal M has not yet changed to the distance measuring mode, then the routine repeats step 210.

Alternatively, if a YES answer is obtained in step 210, then the routine proceeds to step 220 wherein the data items sampled in each of the modulated frequency-rising and -falling ranges during the azimuth measuring mode are grouped according to the channels ch1 to chNc. The routine proceeds to step 230 wherein the FFT is performed on each of the groups of the data items provided in step 220.

The routine proceeds to step 240 wherein it is determined whether the determination of the target frequencies has been completed in step 160 or not. If a NO answer is obtained, then the routine waits for the determination of the target frequencies to be completed. Alternatively, if a YES answer is obtained, then the routine proceeds to step 250 wherein signal components having the target frequencies which have been determined in step 160 are extracted from the FFTs calculated in step 230 in each of the channels ch1 to chNc.

The routine proceeds to step 260 wherein a variation in signal component extracted in step 250 between the channels ch1 to chNc is compensated for a difference in sampling time between the channels ch1 to chNc. The routine proceeds to step 270 wherein the signal components of the target frequencies extracted in step 250 are subjected to digital beam forming (DBF). The routine proceeds to step 280 wherein using results of the DBF derived in step 270, the angular direction of each target is determined. The routine then returns back to step 210. For instance, U.S. Pat. No. 6,339,395 B1 assigned to the same assignee as that of this application teaches DBF techniques, disclosure of which is incorporated herein by reference.

As apparent from the above discussion, the radar apparatus 2 of this embodiment is designed to use only the first channel in the distance measuring mode to sample the beat signal successively in the same channel, thereby setting the sampling frequency fs which is Nc times (fs=fx/Nc→fx) higher than that in the azimuth measuring mode and minimizing the sweep time T. Thus, half the sampling frequency fs (i.e., fs/2) in the distance measuring mode is much higher than frequencies of the beat signal B arising from the long range targets, thereby preventing these long range target frequencies from being shifted by the FFT to within a preset band of the beat signal B, as discussed in the introductory part of this application, which avoids an error in determining the long rage targets to be identified as targets within the preset target detecting range of the radar apparatus 2.

As compared with the azimuth measuring mode in which the sampling frequency fs in each of the channels ch1 to chNc is lower, noise frequency components in the distance measuring mode which are shifted by the FFT to inside the preset band of the beat signal B are greatly reduced, thus decreasing a rise in noise floor within the preset band, resulting in improved ability of the radar apparatus 2 to determine the beat frequencies fb1 and fb2.

A decrease in the sweep time Tin the distance measuring mode avoids spread of unwanted signal components (i.e., the frequency points) arising from reflection of a radar wave from a road surface produced by the FFT of the beat signal B, thereby facilitating ease of detection of frequency components of the beat signal B produced by reflection of a radar wave from targets, resulting in improved accuracy of determining the beat frequencies fb1 and fb2.

The radar apparatus 2 of this embodiment works to estimate beat frequencies (i.e., the target frequencies), using the distance R to and relative speed V of a target as detected under less influence of reflection of a radar wave from the long range target and/or the road surface, which are to be produced when FFTs of samples of the beat signal B as acquired in the azimuth measuring mode are calculated, and to perform a digital beam forming (DBF) operation on signal components of the target frequencies to determine the angular direction of the target. Specifically, in the azimuth measuring mode in which all the channels ch1 to chNc are employed, the sampling frequency fs in each channel is, as described above, lower, thus increasing the possibility that a frequency component of the beat signal arising from the long range target is shifted by the FFT to inside the preset band of the beat signal. The radar apparatus 2 of this embodiment is, however, designed to determine the angular direction of the target only using the target frequencies as derived in the distance measuring mode, thereby avoiding the above problem as long as the frequency components of the long range target are not identical with the target frequencies, which results in improved reliability to determine the angular direction of the target.

The estimates of the target frequencies are made using data as acquired in the distance measuring mode, but however, the target frequencies may alternatively be determined using the distance R to and relative speed V of a target calculated again using data as acquired in the azimuth measuring mode. This results in improved accuracy of determining the distance R to and relative speed V of the target. The use of the data acquired in the distance measuring mode results in an increased range within which the relative speed V can be determined, while the use of the data acquired in the azimuth measuring mode results in an increased resolution in determining the relative speed V. Selection of one of the two may be made according to a required application.

The radar apparatus 2 is, as described above, designed to use only one of the channels ch1 to chNc in the distance measuring mode, but may alternatively work to use some or all of the chancels ch1 to chNc if half the sampling frequency fs lies within a range which is higher than a maximum frequency of the long range target. In this case, a noise or variation in the FFTs between the channels may be minimized by averaging the FFTs derived in the respective channels, which facilitates determination of a peak in frequency spectrum of the beat signal B.

The radar apparatus 2 according to the second embodiment will be described below which is different from that in the first embodiment in switching the receive antennas of the antenna array 20 and operation of the signal processor 34. Other arrangements and operations are the same, and explanation thereof in detail will be omitted here.

Figure 4:
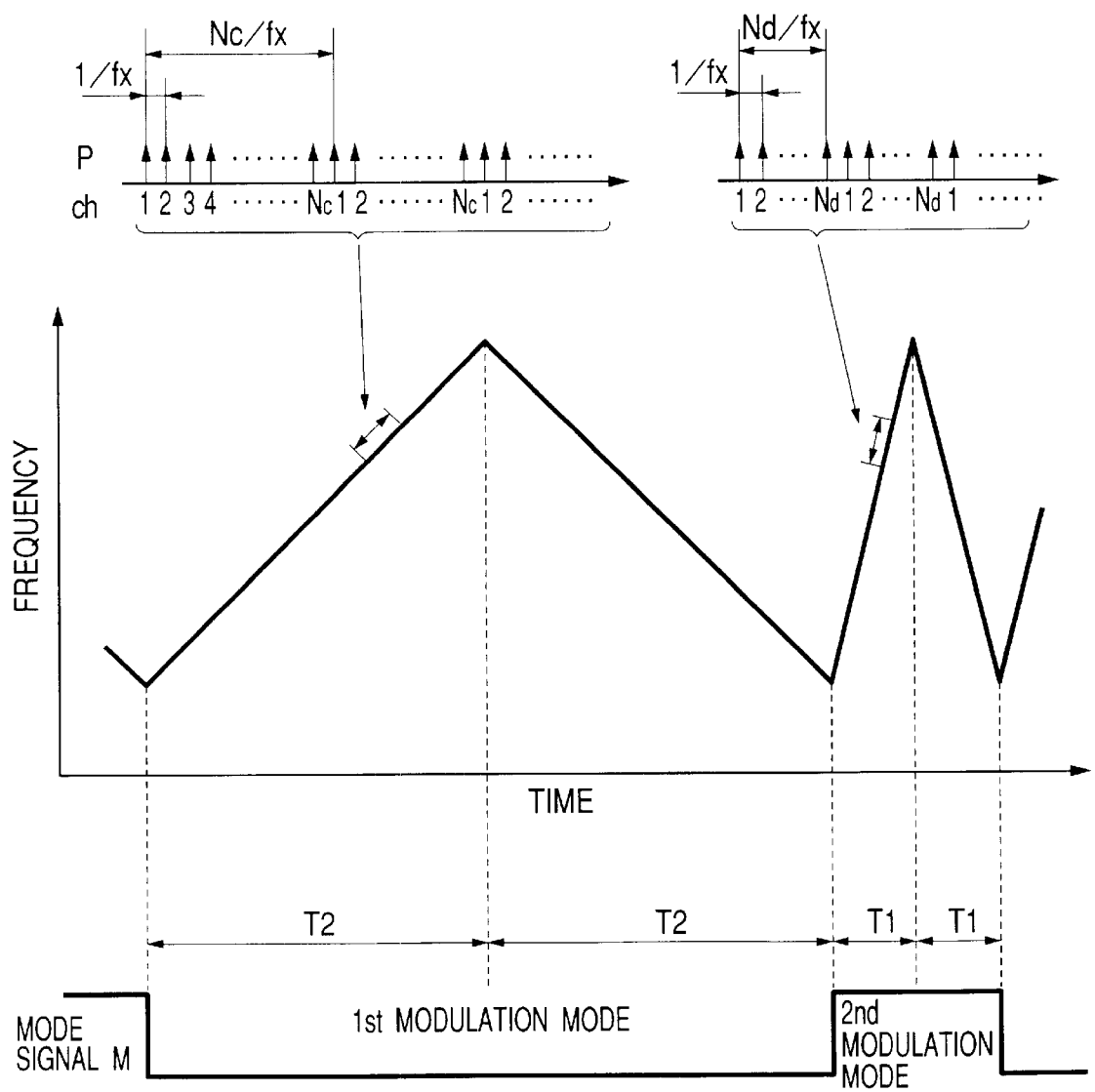
FIG. 4 is an illustration which shows a change in frequency of a transmit signal and a change in level of a mode signal used in a radar apparatus designed according to the second embodiment of the invention.

The timing controller 30, as already described in FIG. 4, outputs the mode signal M whose level varies cyclically from the first level indicating the first modulation mode to the second level indicating the second modulation mode and back to the first level. The first level is, like the first embodiment, kept for a period of time required to output Nc×Dpc pulses, while the second level is kept for a period of time required to output Nd × Dpc pulses (Nd=4 in this embodiment which is smaller than Nc).

The switch controller 32 selects all the channels ch1 to chNc in sequence in response to the timing signal P when the mode signal M outputted from the timing controller 30 is in the first level indicative of the first modulation mode, while it selects predetermined ones (Nd) of the channels ch1 to chNc in sequence in response to the timing signal P when the mode signal M is in the second level indicative of the second modulation mode.

Figure 5:
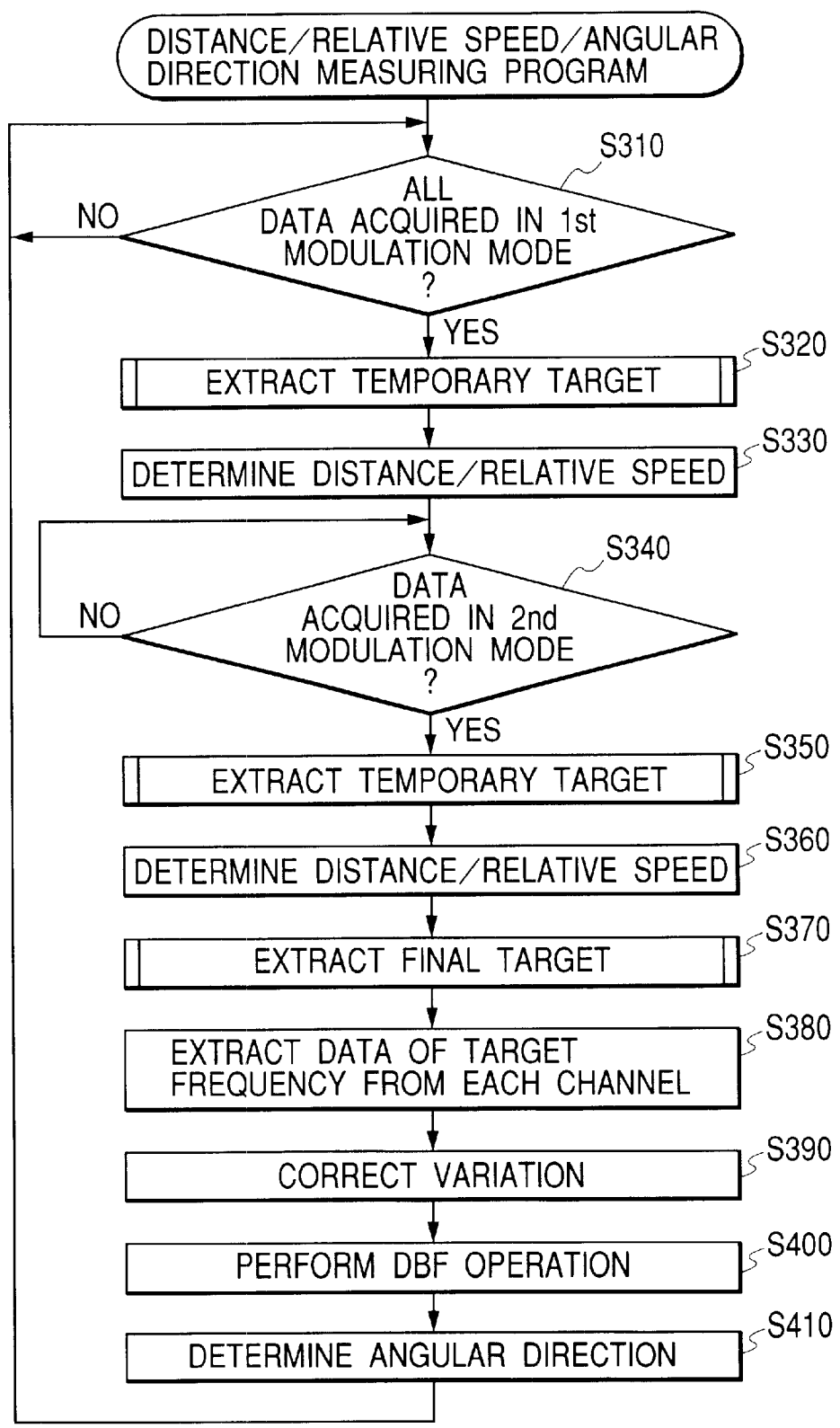
FIG. 5 is a flowchart of a distance/relative speed/angular direction measuring program performed in a radar apparatus of the second embodiment of the invention.

The signal processor 34 produces the modulation command signal so as to change the sweep time T between the first and second modulation modes. The sweep time Ti in the first modulation mode is set to Nc×Dpc×1/fx. The sweep time T2 in the second modulation mode is set to Nd×Dpc×1/fx. The signal processor 34 performs a distance/relative speed/angular direction measuring program, as shown in FIG. 5, to determine the distance, relative speed, and angular direction of a target using samples of the beat signal B produced through the A/D converter 28.

Upon entering the distance/relative speed/angular direction measuring program, the routine proceed to step 310 wherein it is determined whether all data items of the beat signal B in the first modulation mode have been sampled or not. If a NO answer is obtained, then the routine repeats step 310.

Alternatively, if a YES answer is obtained in step 310 meaning that all the data items in the first modulation mode have been sampled, then the routine proceeds to step 320 wherein all the samples are broken down into data groups according to the modulated frequency-rising and -falling ranges and the channels ch1 to chNc. The data groups are each subjected to the FFT in the same manner as in step 120 of FIG. 3. The same pairing and peak searching operations as in steps 130 and 140 are performed on the FFTs to define pairs of frequencies of signal components (will also be referred to as frequency pairs below) as temporary targets.

The routine proceeds to step 330 wherein the distance R to and relative speed V of each of the temporary targets are determined using Eqs. (3) and (4), as described above.

After completion of the above operation in the first modulation mode, the routine proceeds to step 340 wherein it is determined whether all data items of the beat signal B in the second modulation mode have been sampled or not. If a NO answer is obtained, then the routine repeats step 340.

Alternatively, if a YES answer is obtained in step 340 meaning that all the data items in the second modulation mode have been sampled, then the routine proceeds to step 350 wherein the same grouping, pairing, peak searching operations as those in step 320 are performed on the samples acquired in the second modulation mode to determine as temporary targets.

The routine proceeds to step 360 wherein the distance R to and relative speed V of each of the temporary targets are, like step 330, determined.

The routine proceeds to step 370 wherein the temporary targets determined in steps 320 and 350 which coincide in the distance R and relative speed Vas determined in steps 330 and 360 with each other within a given permissible range are selected as the same targets and determined as final targets.

The routine proceeds to step 380 wherein signal components having the target frequencies of each of the final targets are extracted from FFTs of the data items derived in each of the channels ch1 to chNc in the first modulation mode. The routine proceeds to step 390 wherein a variation in signal component extracted in step 380 between the channels chi to chNc is compensated for a difference in sampling time between the channels ch1 to chNc. The routine proceeds to step 400 wherein the signal components of the target frequencies are subjected to digital beam forming (DBF). The routine proceeds to step 410 wherein using results of the DBF derived in step 400, the angular direction of each target is determined. The routine then returns back to step 310.

Figure 6:
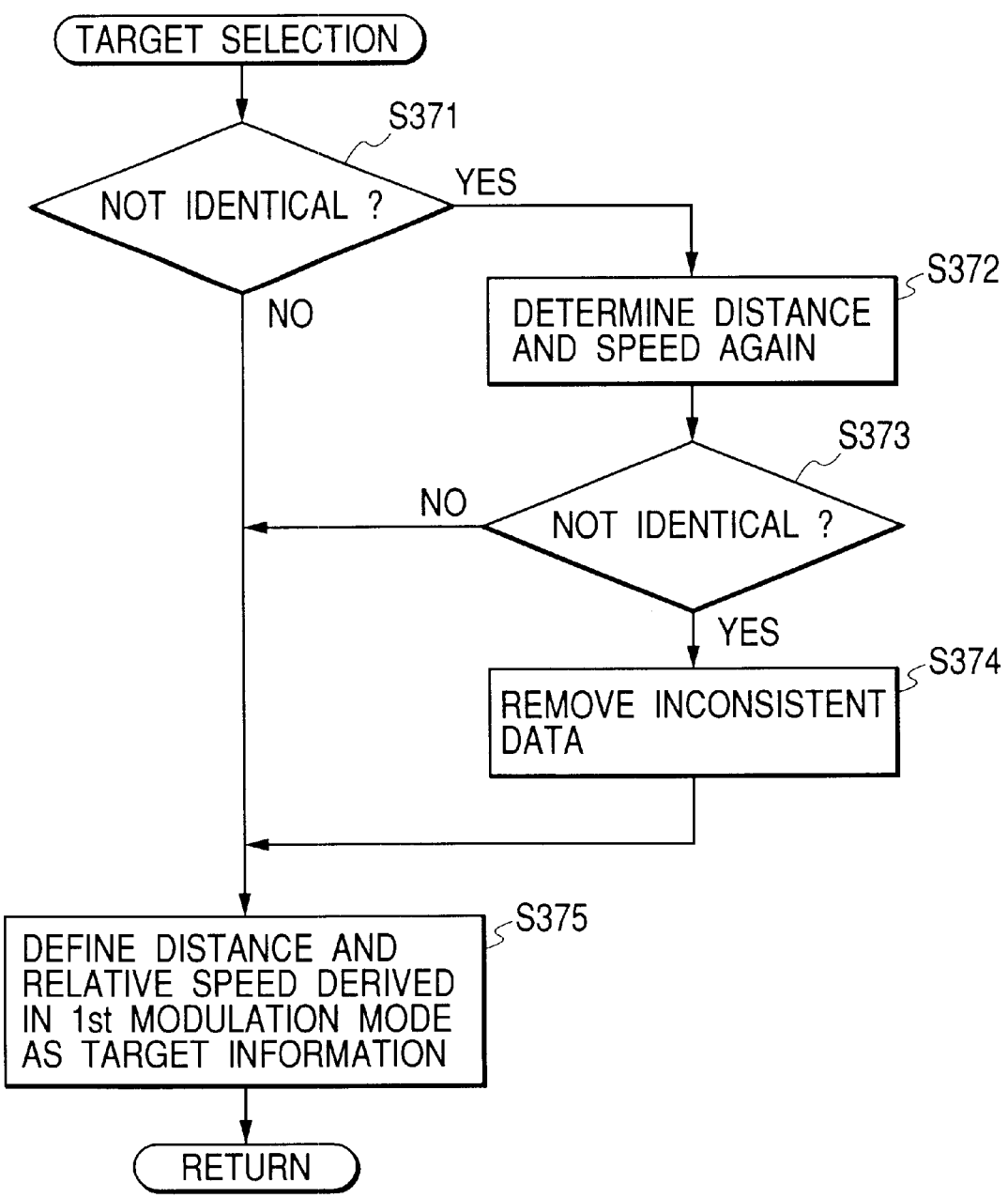
FIG. 6 is a flowchart of a sub-program performed in step 370 of FIG. 5.

The target selecting operation as performed in step 370 will be described in detail with reference to FIG. 6.

First, in step 371, it is determined whether there is at least one of the temporary targets as determined in step 320 which is not identical in the distance R and relative speed V calculated in steps 330 and 360 with any of the temporary targets as determined in step 350 or not.

If a YES answer is obtained, then the routine proceeds to step 372 wherein the lower of beat frequencies of each temporary target as determined in step 371 as being inconsistent with any of the temporary targets as determine din step 350 is defined as a negative value to determine the distance R and the relative speed V using Eqs. (3) and (4) again.

The routine proceeds to step 373 wherein it is determined whether there are the distances R and the relative speeds V, as re-calculated in step 372, which are inconsistent with those calculated in step 360 or not. If a YES answer is obtained, then the routine proceeds to step 374 wherein the distances R and the relative speeds V determined in step 373 as being inconsistent with those calculated in step 360 are eliminated.

If a NO answer is obtained in step 373 or after step 374, the routine proceeds to step 375 wherein pairs of the temporary targets identical in distance R and relative speed V with each other are defined as final targets, respectively, and the distance R and relative speed V of each of the final targets as calculated using the data acquired in the first modulation mode are stored in a memory as target information.

As apparent from the above discussion, the radar apparatus 2 of this embodiment is designed to detect the same target using two measurements in the first and second modulation modes and identify it as a final target only when the two measurements are identical with each other, thereby removing frequencies of signal components acquired in one of the first and second modulation modes each of which does not form a pair with that acquired in the other modulation mode and would arise from a noise component. This results in improved reliability of detection of targets.

The radar apparatus 2 also works to define the lower of beat frequencies of one of the temporary targets (i.e., the frequency pairs) selected in the first modulation mode which does not correspond to any of the temporary targets selected in the second modulation mode as a negative value and use it to calculate the distance R and relative speed V again for identifying the one of the temporary targets as a final target. Thus, even if there is a beat signal which has arisen in the first modulation mode from a transmit and a received signal in which a relation in level between frequencies thereof has been reversed to an original one, it is possible to acquire a target originating that beat signal correctly.

Figure 14A:
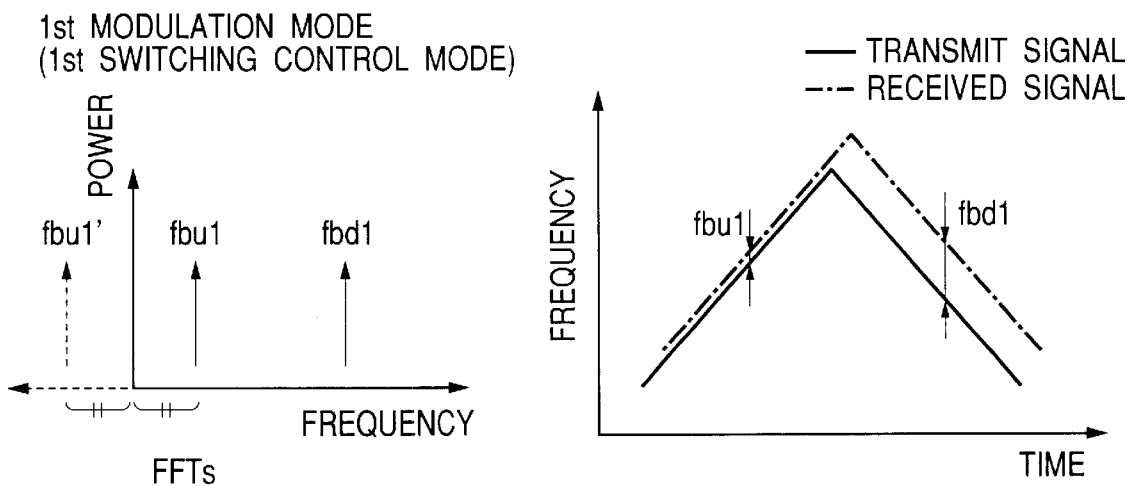
FIG. 14($a$) shows a relation between a transmit signal and a receive signal and FFTs of samples of a beat signal in a first modulation mode.
Figure 14B:
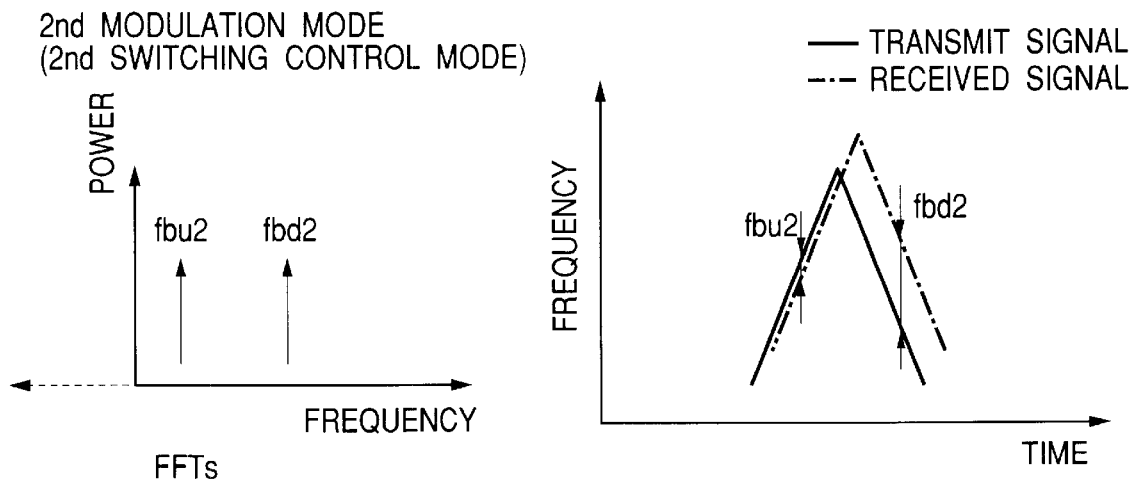

Specifically, if the inclination of the modulated frequency of the transmit signal in the second modulation mode is, as shown in FIG. 14(b), greater than in the first modulation mode, as shown in FIG. 14(a), the possibility that the relation in frequency level between the transmit signal and the received signal has been reversed in either of the modulated frequency-rising and -falling ranges is lower. The above re-calculation in step 372 results in improved accuracy of identifying a target when the relation in frequency level between the transmit signal and the received signal is reversed only in the first modulation mode.

The distance R and relative speed V are determined again only when step 371 determines that a beat frequency should be reversed in sign, but however, may also be re-calculated when the beat frequency is shifted by the FFT to one which is symmetrical with respect to half the sampling frequency fs.

Figure 15:
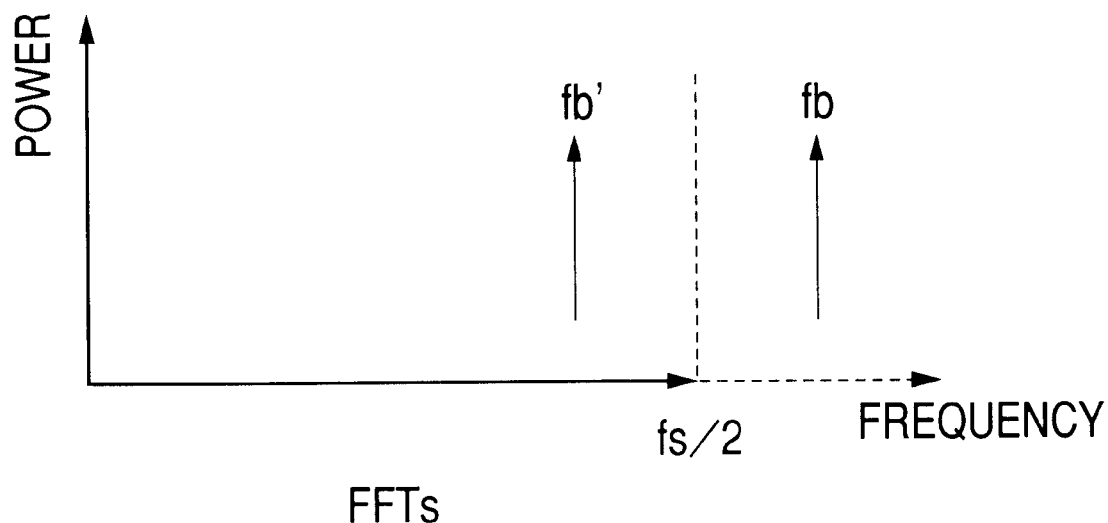
FIG. 15 is an illustration which shows a shift in beat frequency caused by FFT across half a sampling frequency fs.

The FFT of samples of the beat signal, as shown in FIG. 15, will cause the frequency component fb higher than the sampling frequency fs to be shifted across half the sampling frequency fs (i.e., fs/2) and measured as fb'.

Therefore, if there is one of the frequency pairs derived in the first modulation mode which is inconsistent with any of the frequency pairs derived in the second modulation mode, the signal processor 34 may first define each of frequency components of the one of the frequency pairs as being arising from the above FFT-caused shift, determine the distance R and the relative speed V again in step 372, and compare them with those calculated in the second modulation mode in step 373 for identifying the target in step 375. If the distance R and the relative speed V re-calculated in step 372 are determined in step 373 as being inconsistent with any of those calculated in step 360, the signal processor 34 next defines both of the frequency components of the one of the frequency pairs as being arising from the above FFT-caused shift, determines the distance R and the relative speed V again in step 372, and compare them with those calculated in the second modulation mode in step 373 for identifying the target in step 375. Note that the frequency component fb is given by fs–fb'.

The radar apparatus 2 according to the third embodiment will be described below which is different from that in the first embodiment in the mode signal M produced by the timing controller 30 and operation of the signal processor 34. Other arrangements and operations are the same, and explanation thereof in detail will be omitted here.

The timing controller 30 is designed to produce the mode signal M which works to perform the second modulation mode cyclically at a preselected interval in a sequence of the first modulation modes.

Figure 7A:
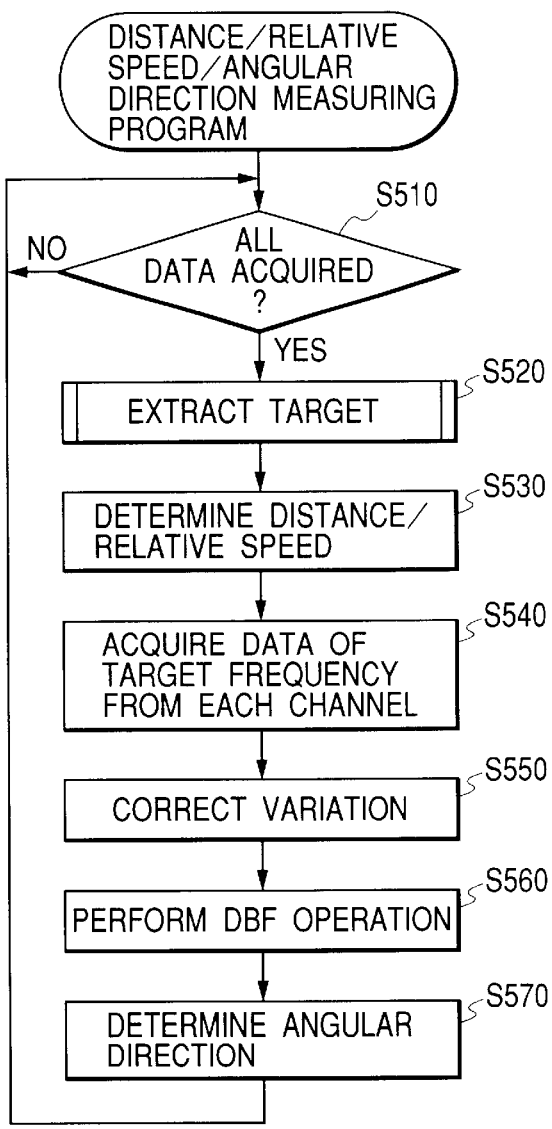
FIG. 7($a$) is a flowchart of a distance/relative speed/ angular direction measuring program performed in a radar apparatus designed according to the third embodiment of the invention.
Figure 7B:
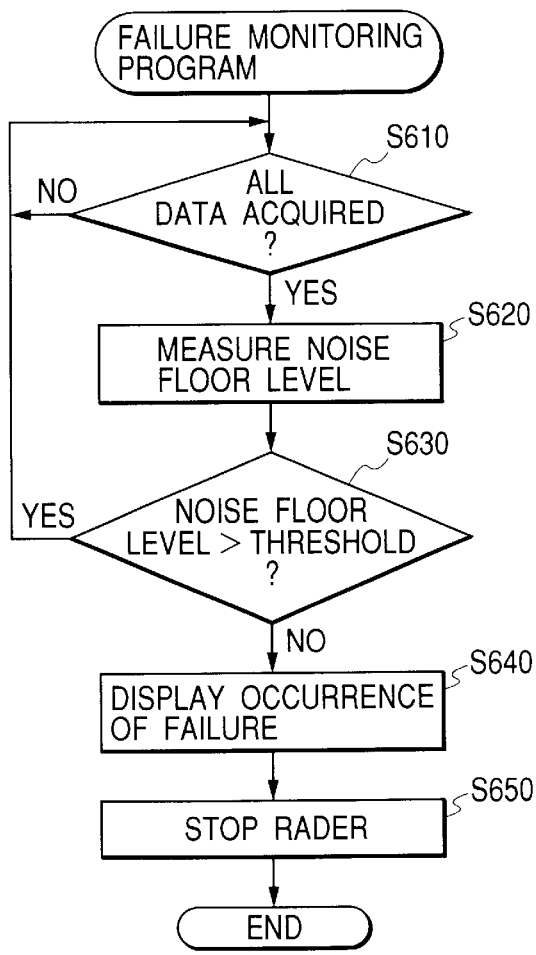

The signal processor 34 performs a distance/relative speed/angular direction measuring program, as shown in FIG. 7(a), to determine the distance, relative speed, and angular direction of a target using samples of the beat signal B produced through the A/D converter 28 in the first modulation mode and also performs a failure monitoring program, as shown in FIG. 7(b), to monitor a failure in operation of the radar apparatus 2 using samples of the beat signal B produced in the second modulation mode.

Upon entering the distance/relative speed/angular direction measuring program, the routine proceed to step 510 wherein it is determined whether all data of the beat signal B in the first modulation mode have been sampled or not. If a NO answer is obtained, then the routine repeats step 510.

Alternatively, if a YES answer is obtained in step 510 meaning that all the data in the first modulation mode have been sampled, then the routine proceeds to step 520 wherein all the data are broken down into data groups according to the first and second modulation modes and the channels ch1 to chNc. The data groups are each subjected to the FFT in the same manner as in step 120 of FIG. 3. The same pairing and peak searching operations as in steps 130 and 140 are performed on the FFTs to define frequencies of signal components paired (i.e., the frequency pairs below) as arising from targets.

The routine proceeds to step 530 wherein the distance R to and relative speed V of each of the targets are determined using Eqs. (3) and (4), as described above.

The routine proceeds to step 540 wherein signal components having the target frequencies of each of the targets are extracted from FFTs of the data derived in each of the channels ch1 to chNc. The routine proceeds to step 550 wherein a variation in signal component extracted in step 540 between the channels ch1 to chNc is compensated for a difference in sampling time between the channels ch1 to chNc. The routine proceeds to step 560 wherein the signal components of the target frequencies are subjected to digital beam forming (DBF). The routine proceeds to step 570 wherein using results of the DBF derived in step 560, the angular direction of each target is determined. The routine then returns back to step 510.

Upon entering the failure monitoring program, as shown in FIG. 7(b), the routine proceeds to step 610 wherein it is determined whether all data of the beat signal B in the second modulation mode have been sampled or not. If a NO answer is obtained, then the routine repeats step 610.

Alternatively, if a YES answer is obtained in step 610 meaning that all the data in the second modulation mode have been sampled, then the routine proceeds to step 620 wherein a noise floor level of the beat signal B is determined using the data sampled in the second modulation mode. The routine proceeds to step 630 wherein it is determined whether the noise floor level is greater than a given threshold value or not. If a YES answer is obtained, the routine returns back to step 610. Alternatively, if a NO answer is obtained meaning that the radar apparatus 2 is malfunctioning, then the routine proceeds to step 640 wherein the fact that a failure in operation of the radar apparatus 2 has occurred is indicated on a display (not shown). The routine proceeds to step 650 wherein the radar apparatus 2 is turned off.

Figure 8:
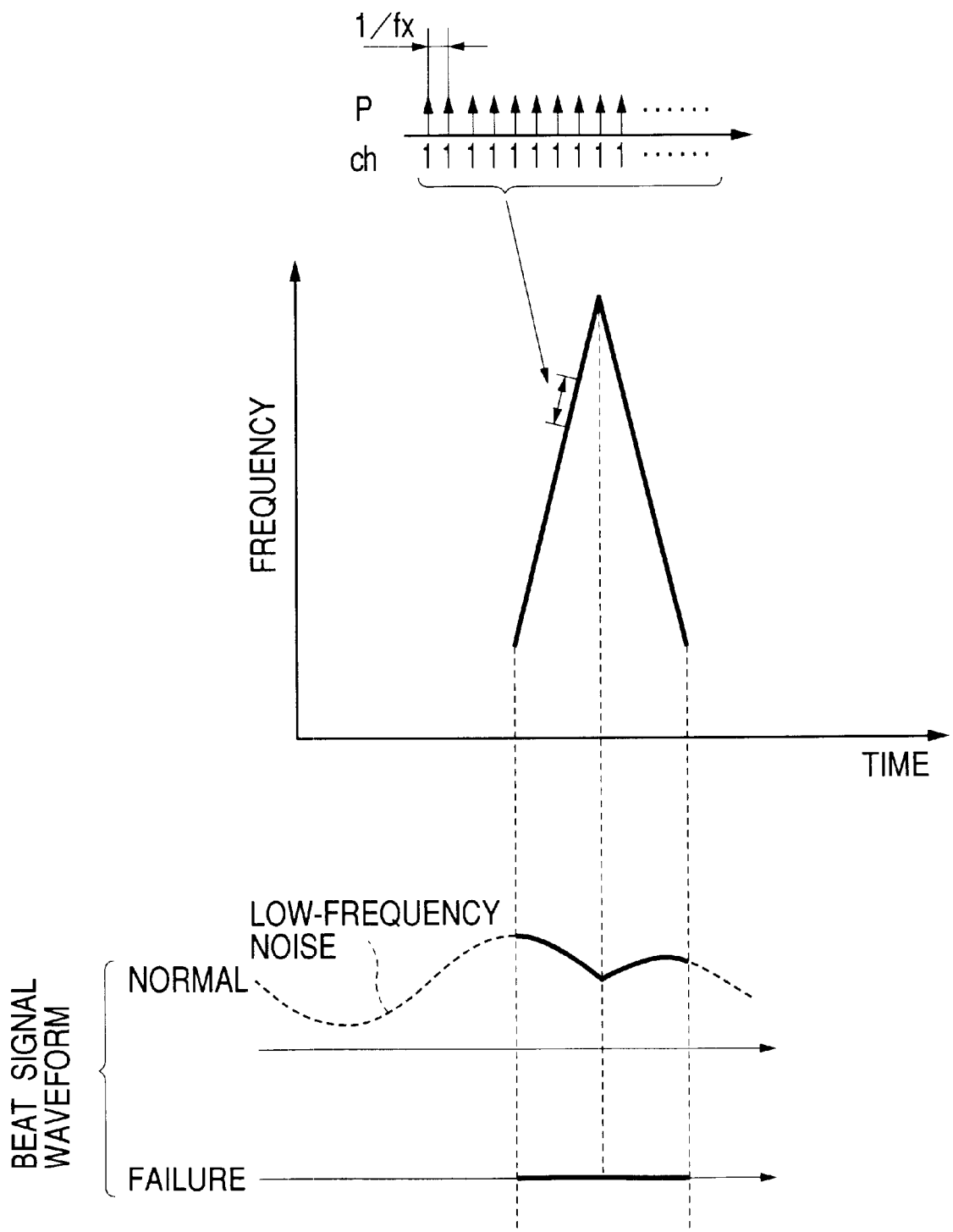
FIG. 8 is an illustration which shows a change in frequency of a transmit signal and a change in level of a noise component contained in a beat signal.
Figures 9A, 9B:
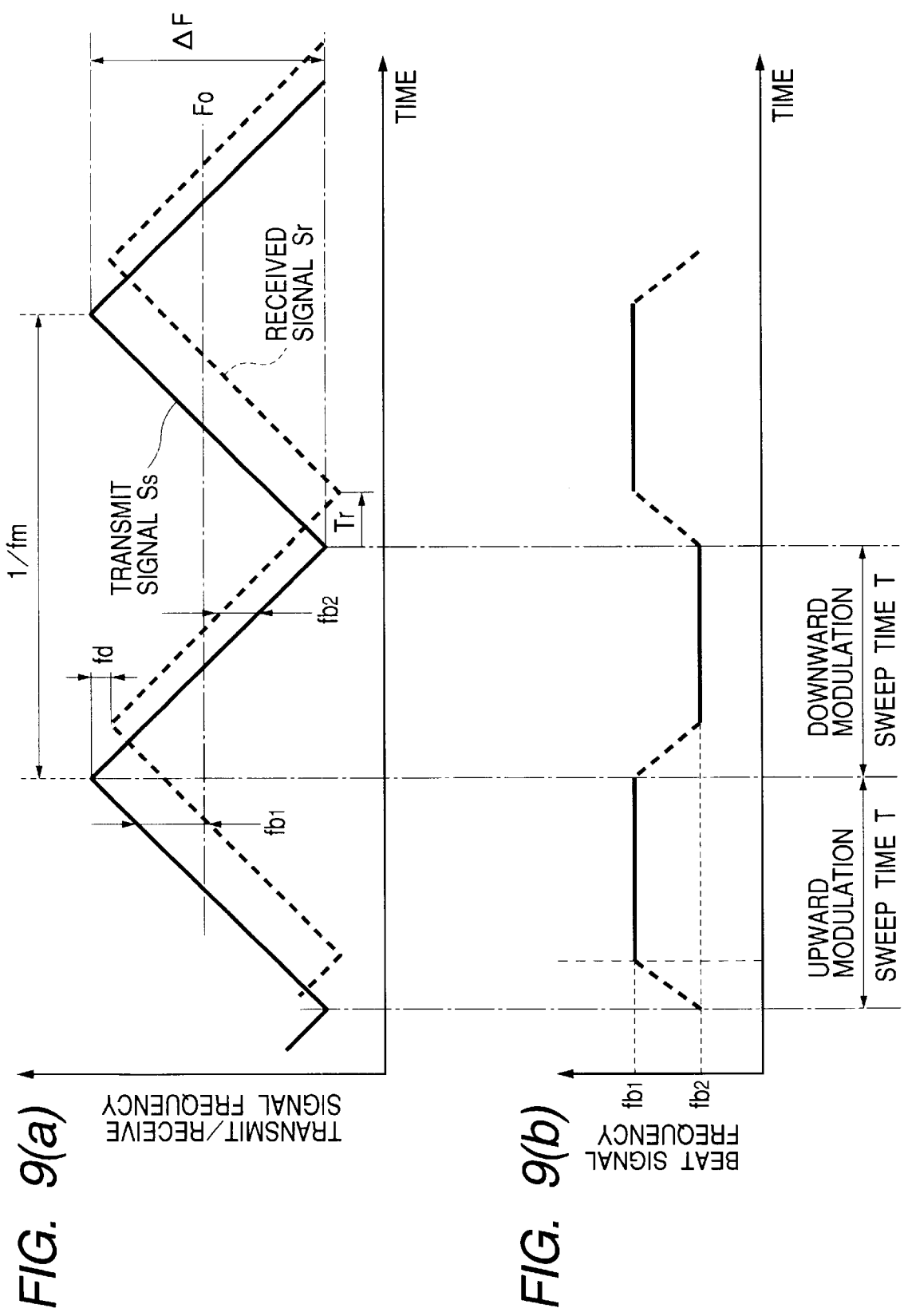
FIG. 9($a$) shows the waveforms of transmitted and received signals in a typical FMCW radar.
Figure 10A:
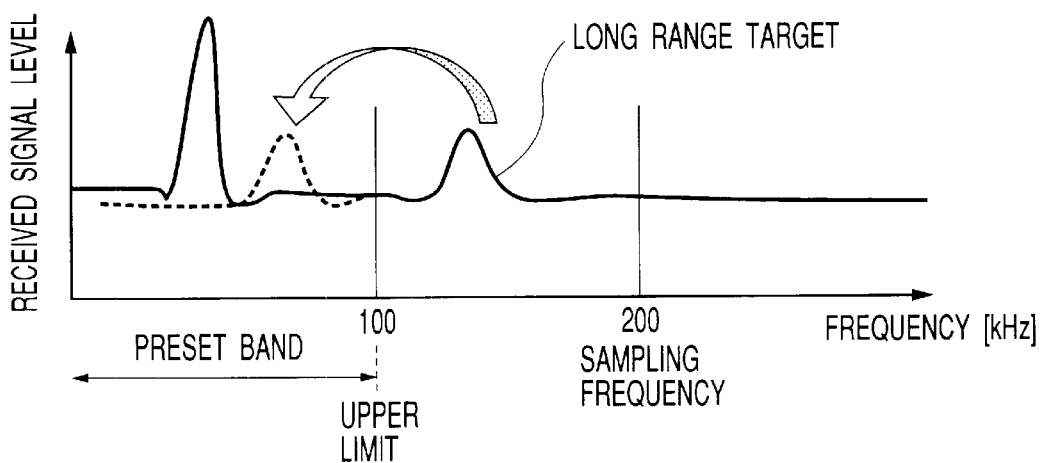
FIG. 10($a$) is an illustration which shows a frequency spectrum of a beat signal containing a noise frequency component duel to a long range target lying out of a preset band of the beat signal.
Figure 10B:
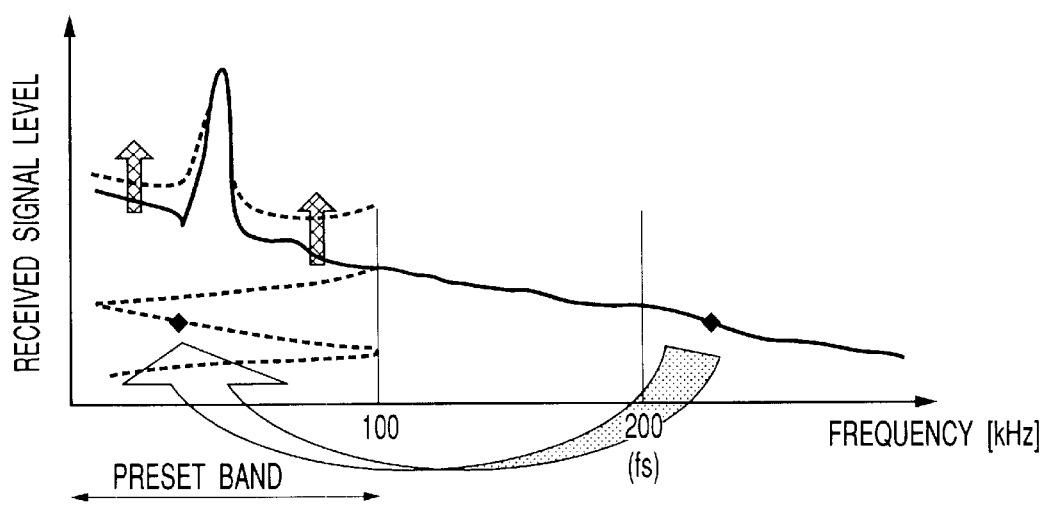
Figure 10C:
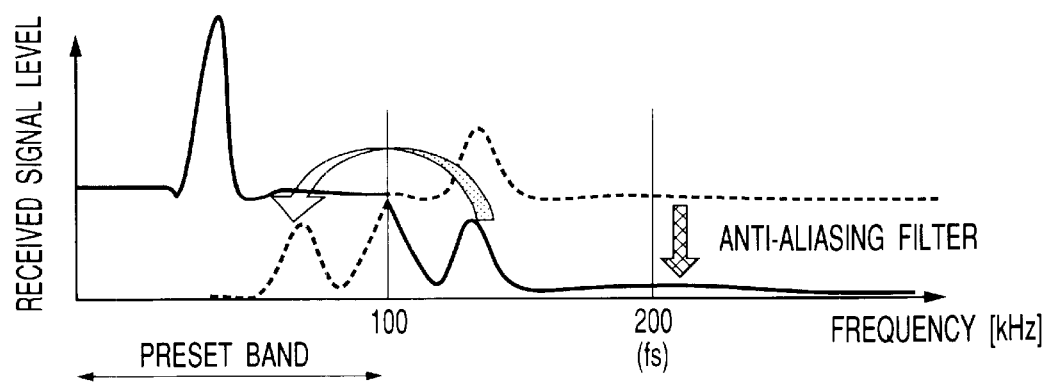
Figure 11A:
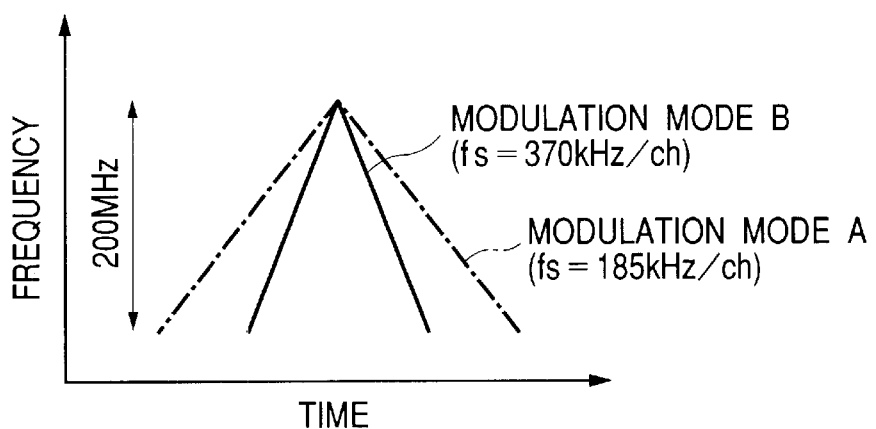
FIG. 11($a$) is an illustration which shows a variation in sweep time of a transmit signal for different values of a sampling frequency of a beat signal in one channel in a modulation mode A (185 kHz) and a modulation mode B (370 kHz)
Figure 11B:
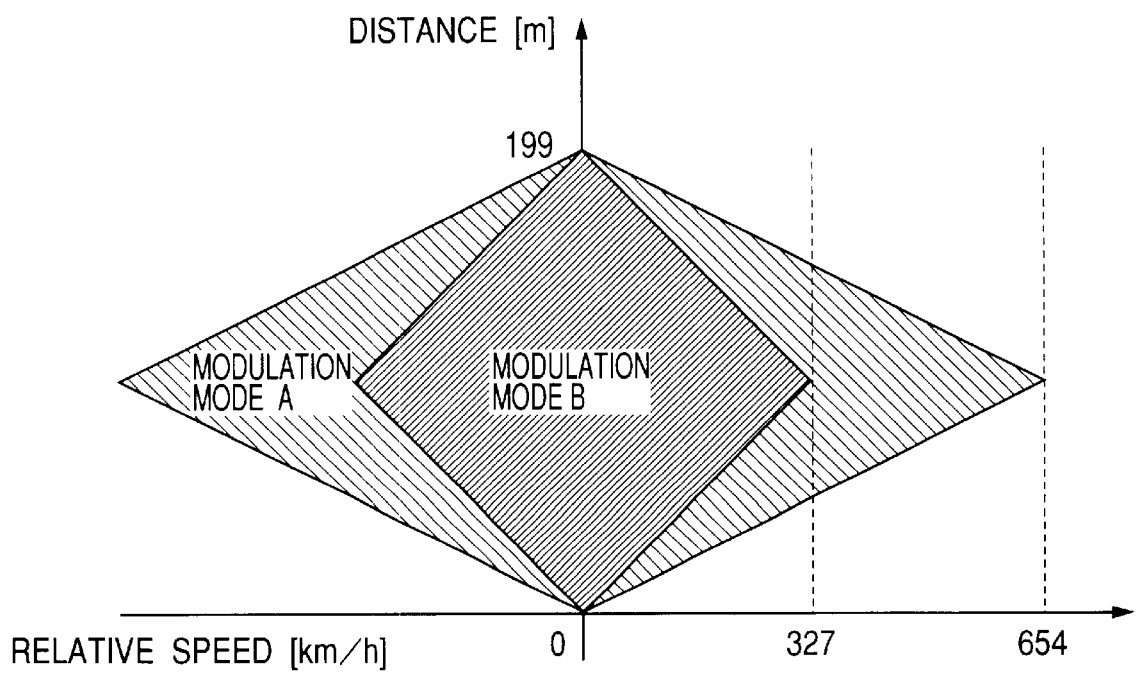
Figure 12:
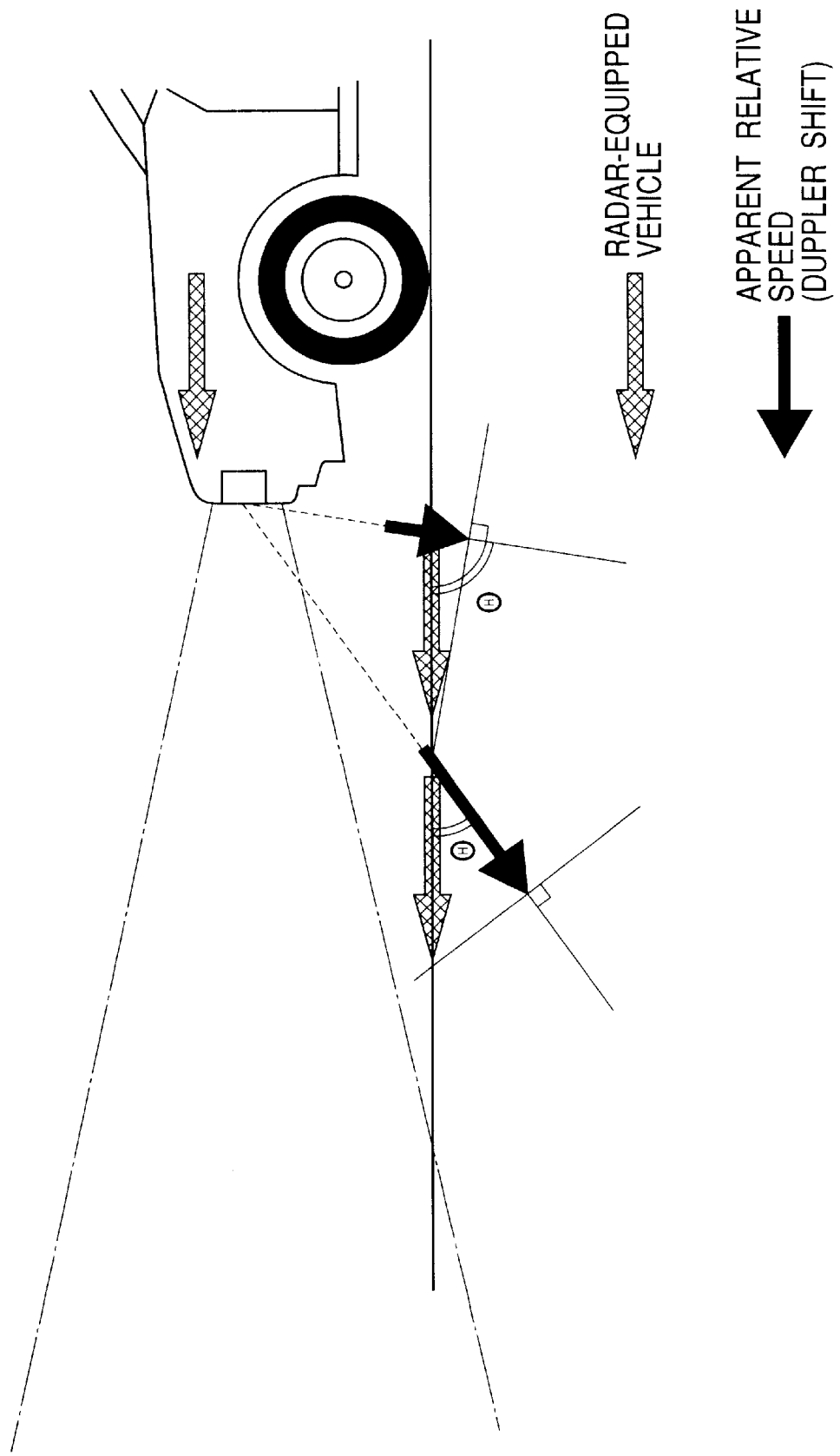
FIG. 12 is an illustration which shows a radar wave falling on a road surface.
Figure 13A:
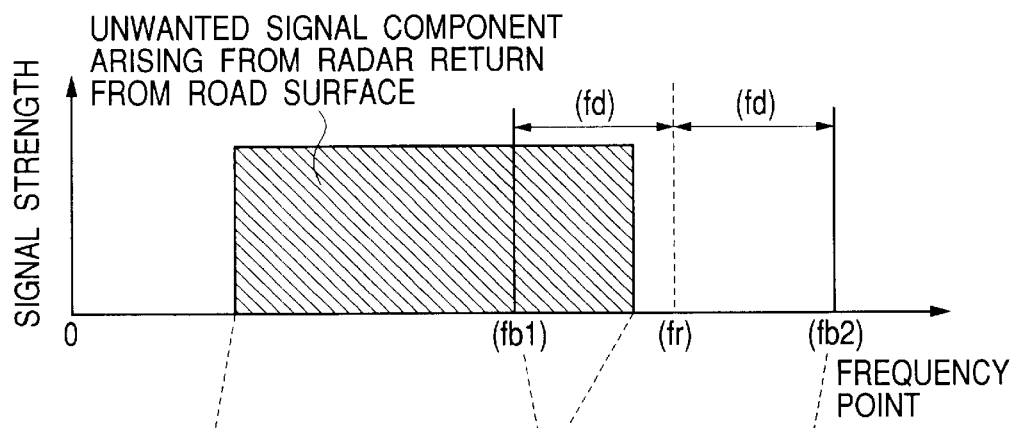
FIG. 13($a$) is an illustration which shows frequency points of beat frequencies when a modulation cycle is longer.
Figure 13B:
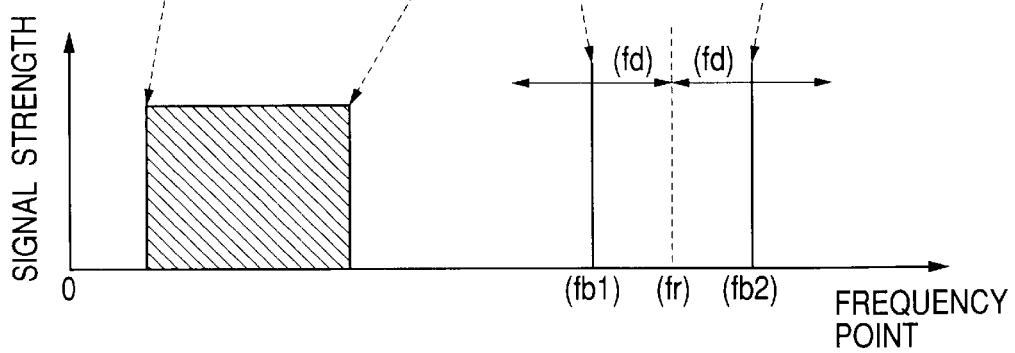

Usually, an FM-AM conversion noise, as illustrated in FIG. 8 as a low-frequency noise, arises from a change in power (i.e., amplitude) of the transmit signal Ss produced by the voltage-controlled oscillator 14 as a function of an oscillation frequency thereof and appears as the noise floor of the beat signal B. The FM-AM conversion noise is inevitably detected whenever the radar apparatus 2 is in service. It is, thus, possible to determine that a failure in operation of the radar apparatus 2 has occurred when the FM-AM conversion noise is not detected.

The detection of the noise floor may be achieved only by finding signal levels of samples of the beat signal B before subjected to the FFT. It is unnecessary to acquire the samples over the second modulation mode. The noise floor may, thus, be detected using a minimum number of the samples required to monitor a failure in operation of the radar apparatus 2.

The FM-AM conversion noise usually increases with an increase in frequency variation ΔF of the voltage-controlled oscillator 14. The frequency variation ΔF may, thus, be increased in the second modulation mode.

The failure monitoring program of this embodiment may be executed in either of the first and second embodiments to monitor a failure in operation of the radar apparatus 2 using data acquired in the second modulation mode.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims. For example, the radar apparatus 2 may be designed to have a single receive antenna and a plurality of transmit antennas. In this case, decreasing the sweep time T as much as possible is preferably achieved by decreasing the transmit antenna. This is advantageous in shortening a time interval needed for switching between the transmit antennas in order to avoid the problem, as already described in the introductory part of this application, that after the channels has been switched from one to another, a beat signal arising from a return of a radar wave outputted by a preceding one of the transmit antennas from being sampled in error as arising from a return of a radar wave outputted from the transmit antenna of the channel now selected.

What is claimed is:

1. A radar apparatus comprising:
    a transmit signal generator generating a transmit signal which is so modulated in frequency as to vary with time cyclically;
    a transceiver having a plurality of channels each of which is made up of a transmit antenna and a receive antenna, said transceiver outputting the transmit signal in the form of a radar wave and receiving a return of the radar wave from a target through any of the channels;
    a switching circuit switching one of the channels from another which is to be used in said transceiver, said switching circuit performing a first switching control mode and a second switching control mode within each cycle of frequency-modulation of the transmit signal, in the first switching control mode, all the channels being selected in sequence in a cycle, in the second switching control mode, a predetermined number of the channels being selected in a cycle;
    a beat signal generator mixing a signal received by said transceiver that is the return of the radar wave from the target with a local signal that has the same frequency as that of the transmit signal to generate a beat signal; and
    a signal processor sampling the beat signal produced by said beat signal generator and subjecting samples of the beat signal to a given signal processing operation to produce predetermined information about the target.

2. A radar apparatus as set forth in claim 1, wherein said transmit signal generator changes a cycle of frequency-modulation of the transmit signal to a time length required to acquire the samples of the beat signal required in an operation of said signal processor as a function of a number of the channels to be switched by the switching circuit.

3. A radar apparatus as set forth in claim 1, wherein said signal processor is designed to perform a first operation mode in which an angular direction of the target is determined using a component of the beat signal acquired in the first switching control mode and a second operation mode in which a distance to and a relative speed of the target are determined using a component of the beat signal acquired in the second switching control mode.

4. A radar apparatus as set forth in claim 3, wherein said signal processor works in the first operation mode to estimate a frequency component, which is to be concluded in the beat signal in the second operation mode, using on a frequency component of the beat signal derived by a given operation performed in the first operation mode, said signal processor determining the angular direction of the target using the estimated frequency component.

5. A radar apparatus as set forth in claim 2, wherein said signal processor forms, in each of the first and second switching control modes, frequency pairs each of which is made up of a frequency component of the beat signal acquired within a modulated frequency-rising range in which the frequency of the transmit signal rises and a frequency component of the beat signal acquired in a modulated frequency-falling range in which the frequency of the transmit signal falls and determines a distance to and a relative speed of an object using each of the frequency pairs, said signal processor identifying one of the frequency pairs formed in the first switching control mode which is identical in the distance and the relative speed with any of the frequency pairs formed in the second switching control mode as the target to be acquired by the radar apparatus.

6. A radar apparatus as set forth in claim 5, wherein if there is one of the frequency pairs produced in the first operation mode which is inconsistent in the distance and the relative speed with any of the frequency pairs produced in the second operation mode, said signal processor defines the lower of frequencies of the frequency pair inconsistent in the distance and the relative speed and calculates the distance and the relative speed again using the negative value.

7. A radar apparatus as set forth in claim 6, wherein if there is one of the frequency pairs derived in the first operation mode which is inconsistent in the distance and the relative speed with any of the frequency pairs derived in the second operation mode, said signal processor defines either or both of the frequency components of the one of the frequency pairs as having been shifted across half of a sampling frequency at which the beat signal is sampled, determines the distance and the relative speed again, and compares them with those calculated in the second operation mode for identifying the target.

8. A radar apparatus as set forth in claim 1, wherein said transceiver includes a plurality of receive antennas, wherein said switching circuit includes a switch designed to select one of signals received by the receive antennas as said received signal, and wherein said beat signal generator includes a single mixer to produce the beat signal.

9. A radar apparatus as set forth in claim 1, further comprising a failure determining circuit which monitors the presence of an FM-AM conversion noise component added to the beat signal produced by said beat signal processor, in the absence of the FM-AM conversion noise component, the failure determining circuit providing a signal indicative of occurrence of the failure of the radar apparatus.

* * * * *